United States Patent
Ko et al.

(10) Patent No.: US 9,507,658 B2
(45) Date of Patent: Nov. 29, 2016

(54) DATA READING METHOD, MEMORY STORAGE DEVICE AND MEMORY CONTROLLING CIRCUIT UNIT

(71) Applicant: PHISON ELECTRONICS CORP., Miaoli (TW)

(72) Inventors: Hong-Lipp Ko, Miaoli County (TW); Chih-Wei Tsai, Hsinchu County (TW); Kheng-Joo Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 223 days.

(21) Appl. No.: 14/583,118

(22) Filed: Dec. 25, 2014

(65) Prior Publication Data
US 2016/0132384 A1    May 12, 2016

(30) Foreign Application Priority Data
Nov. 7, 2014    (TW) .............................. 103138734 A

(51) Int. Cl.
*G06F 11/00*    (2006.01)
*G06F 11/07*    (2006.01)
*G06F 12/02*    (2006.01)

(52) U.S. Cl.
CPC ......... *G06F 11/0793* (2013.01); *G06F 11/073* (2013.01); *G06F 12/0238* (2013.01); *G06F 2212/1032* (2013.01)

(58) Field of Classification Search
CPC .............. G06F 11/073; G06F 11/0793; G06F 12/0238; G06F 2212/1032
See application file for complete search history.

(56) References Cited

U.S. PATENT DOCUMENTS

| | | | |
|---|---|---|---|
| 8,244,963 B2 * | 8/2012 | Yeh ..................... | G06F 12/0862 711/103 |
| 2005/0223175 A1 * | 10/2005 | Hepner ............... | G06F 12/0862 711/137 |
| 2007/0113000 A1 * | 5/2007 | Murin .................... | G11C 16/26 711/103 |
| 2012/0311247 A1 * | 12/2012 | Yeh ........................ | G06F 3/0611 711/103 |
| 2013/0139036 A1 * | 5/2013 | Lee ..................... | G06F 11/1072 714/773 |
| 2014/0181372 A1 * | 6/2014 | Liu ..................... | G06F 12/0862 711/103 |
| 2015/0149818 A1 * | 5/2015 | Kalavade .............. | G06F 11/073 714/6.13 |

* cited by examiner

*Primary Examiner* — Marc Duncan
(74) *Attorney, Agent, or Firm* — Jianq Chyun IP Office

(57) ABSTRACT

A data reading method, a memory storage device and a memory controlling circuit unit are provided. The method includes: receiving a first read command; setting a plurality of first read events in a multi trigger queue (MTQ) according to the first read command, wherein the first read events include a general read event and at least one cache read event; sending a first read command sequence according to at least one of the first read events and receiving first data from a rewritable non-volatile memory module; and if a decoding for the first data fails, resetting the MTQ, and sending at least one second read command sequence according to at least one second read event in the reset MTQ, wherein the at least one second read event includes at least one of the at least one cache reading event.

27 Claims, 19 Drawing Sheets

DATA READING METHOD, MEMORY STORAGE DEVICE AND MEMORY CONTROLLING CIRCUIT UNIT

CROSS-REFERENCE TO RELATED APPLICATION

This application claims the priority benefit of Taiwan application serial no. 103138734, filed on Nov. 7, 2014. The entirety of the above-mentioned patent application is hereby incorporated by reference herein and made a part of this specification.

BACKGROUND

Technical Field

The invention relates to a data reading method, and more particularly, relates to a data reading method, a memory storage device and a memory controlling circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In the memory storage device, a pre-read operation refers to when a read command is received from a host system, in addition to data requested by the read commands and read from the rewritable non-volatile memory module, the next continuous data of the data being read. Accordingly, a read speed for a sequential read may be accelerated. However, a performance of the pre-read operation may be degraded if a command reception at front end and a data management at back end (e.g., error processing) cannot effectively coordinated.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a data reading method, a memory storage device and a memory controlling circuit unit, which are capable of allowing the command reception at front end and the data management at back end to be effectively coordinated.

A data reading method for a rewritable non-volatile memory module is provided according to an exemplary embodiment of the invention, and the data reading method includes: setting a multi trigger queue; receiving a first read command from a host system; setting a plurality of first read events in the multi trigger queue according to the first read command, wherein the first read events include one general read event and at least one cache read event, wherein data to be read corresponding to the general read event and data to be read corresponding to the cache read event belong to continuous data, the data to be read corresponding to the general read event is requested by the first read command, and the data to be read corresponding to the cache read event is not requested by the first read command; sending at least one first read command sequence according to at least one of the first read events and receiving first data from the rewritable non-volatile memory module in response to the at least one first read command sequence; executing a decoding for the first data; and if the decoding for the first data fails, resetting the multi trigger queue, and sending at least one second read command sequence according to at least one second read event in the reset multi trigger queue, wherein the at least one second read event includes at least one first cache read event in the at least one cache read event.

A memory storage device including a connection interface unit, a rewritable non-volatile memory module and a memory controlling circuit unit is provided according to an exemplary embodiment of the invention. The connection interface unit is configured to couple to a host system. The memory controlling circuit unit is coupled to the connection interface unit and the rewritable non-volatile memory module. The memory controlling circuit unit is configured to set a multi trigger queue. The memory controlling circuit unit is further configured to receive a first read command from the host system. The memory controlling circuit unit is further configured to set a plurality of first read events in the multi trigger queue according to the first read command. The first read events include one general read event and at least one cache read event. Data to be read corresponding to the general read event and data to be read corresponding to the cache read event belong to continuous data, the data to be read corresponding to the general read event is requested by the first read command, and the data to be read corresponding to the cache read event is not requested by the first read command. The memory controlling circuit unit is further configured to send at least one first read command sequence according to at least one of the first read events and receive first data from the rewritable non-volatile memory module in response to the at least one first read command sequence. The memory controlling circuit unit is further configured to execute a decoding for the first data. If the decoding for the first data fails, the memory controlling circuit unit is further configured to reset the multi trigger queue, and send at least one second read command sequence according to at least one second read event in the reset multi trigger queue. The at least one second read event includes at least one first cache read event in the at least one cache read event.

A memory controlling circuit unit configured to control a rewritable non-volatile memory module is provided according to an exemplary embodiment of the invention. The memory controlling circuit unit includes a host interface, a memory interface, an error checking and correcting circuit, a buffer memory and a memory management circuit. The host interface is configured to couple to a host system. The memory interface is configured to couple to a rewritable non-volatile memory module. The memory management circuit is coupled to the host interface, the memory interface, the error checking and correcting circuit and the buffer memory. The memory management circuit is configured to set a multi trigger queue in the buffer memory. The memory management circuit is further configured to receive a first read command from the host system. The memory management circuit is further configured to set a plurality of first read events in the multi trigger queue according to the first read command. The first read events include one general read event and at least one cache read event. Data to be read corresponding to the general read event and data to be read corresponding to the cache read event belong to continuous data, the data to be read corresponding to the general read event is requested by the first read command, and the data to be read corresponding to the cache read event is not requested by the first read command. The memory management circuit is further configured to send at least one first read command sequence according to at least one of the first read events and receive first data from the rewritable non-volatile memory module in response to the at least one first read command sequence. The error checking and correcting circuit is configured to execute a decoding for the first data. If the decoding for the first data fails, the memory management circuit is further configured to reset the multi trigger queue, and send at least one second read command sequence according to at least one second read event in the reset multi trigger queue. The at least one second read event includes at least one first cache read event in the at least one cache read event.

Based on the above, according to the received read commands, the invention is capable of setting the general read event and the cache read events in the multi trigger queue. When the decoding for the data fails, the invention is capable of resetting the multi trigger queue and executing subsequent operations of reading data according to the reset multi trigger queue. Accordingly, the command reception at front end and the data management at back end may be effectively coordinated.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
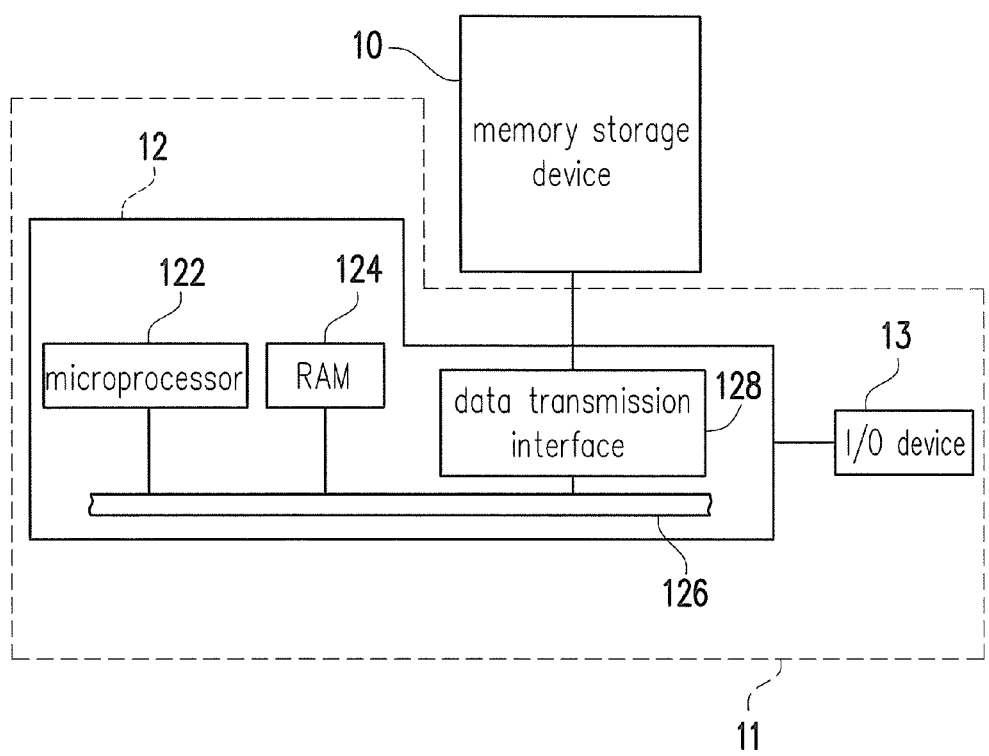
FIG. 1 is a schematic diagram illustrating a host system and a memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 2:
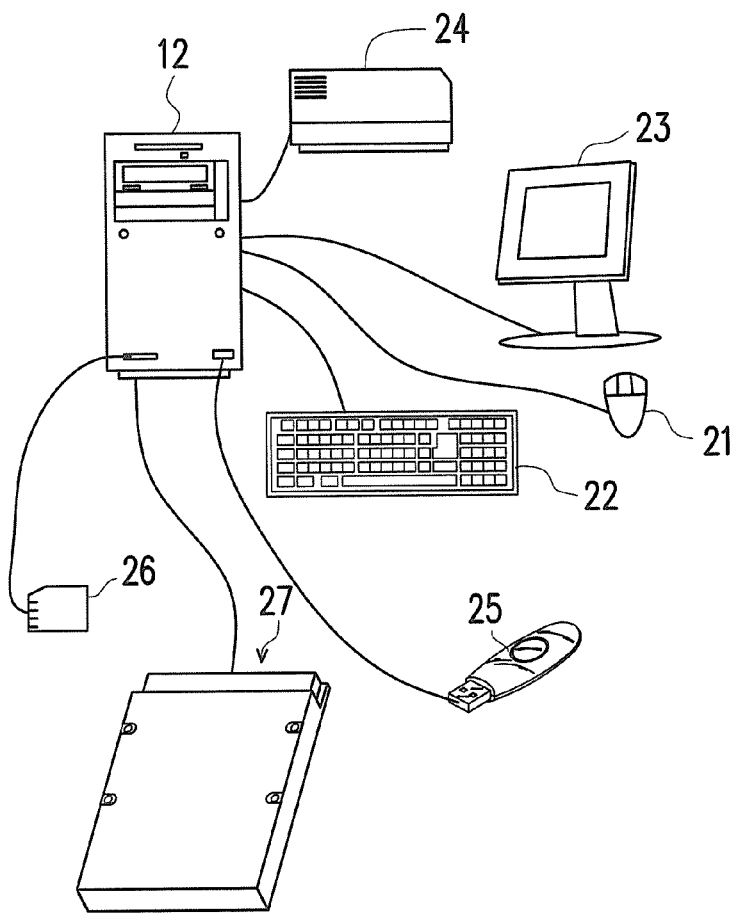
FIG. 2 is a schematic diagram of a computer, an input/output device, and a memory storage device according to an exemplary embodiment of the invention.

FIG. 1 is a schematic diagram illustrating a host system and a memory storage device according to an exemplary embodiment of the invention. FIG. 2 is a schematic diagram of a computer, an input/output device, and a memory storage device according to an exemplary embodiment of the invention.

Referring to FIG. 1, a host system 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In an exemplary embodiment, the memory storage device 10 is coupled to other devices of the host system 11 through the data transmission interface 128. By using the microprocessor 122, the random access memory 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
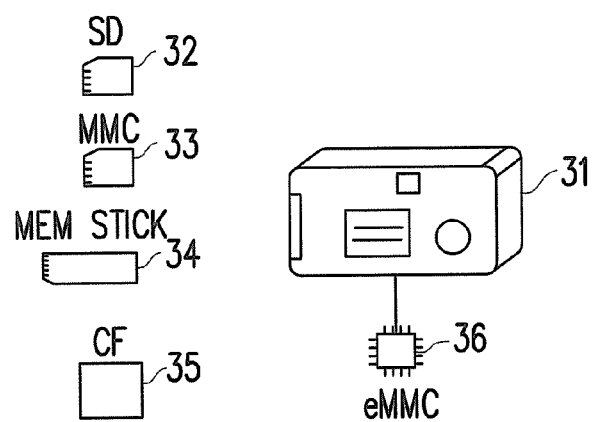
FIG. 3 is a schematic diagram illustrating a host system and a memory storage device according to an exemplary embodiment of the invention.

FIG. 3 is a schematic diagram illustrating a host system and a memory storage device according to an exemplary embodiment of the invention.

Generally, the host system 11 may substantially be any system capable of storing data with the memory storage device 10. In the present exemplary embodiment, the host system 11 is illustrated as a computer system. However, in another exemplary embodiment, the host system 11 may be a system such as a digital camera, a video camera, a telecommunication device, an audio player, or a video player. For example, when the host system is a digital camera (video camera) 31, the rewritable non-volatile memory storage device may be a SD card 32, a MMC card 33, a memory stick 34, a CF card 35 or an embedded storage device 36 (as shown in FIG. 3). The embedded storage device 36 includes an embedded MMC (eMMC). It should be mentioned that the eMMC is directly coupled to a substrate of the host system.

Figure 4:
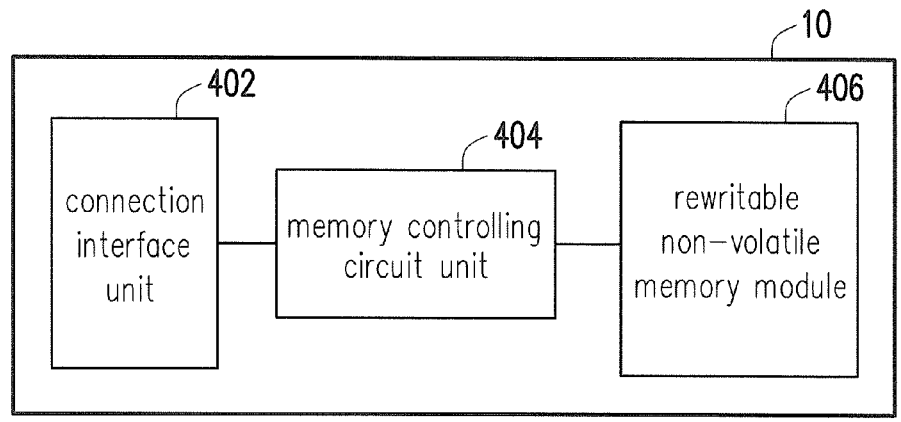
FIG. 4 is a schematic block diagram illustrating the memory storage device depicted in FIG. 1.

FIG. 4 is a schematic block diagram illustrating the memory storage device depicted in FIG. 1.

Referring to FIG. 4, the memory storage device 10 includes a connection interface unit 402, a memory controlling circuit unit 404 and a rewritable non-volatile memory module 406.

In the present exemplary embodiment, the connection interface unit 402 is compatible with a serial advanced technology attachment (SATA) standard. However, the invention is not limited thereto, and the connection interface unit 402 may also be compatible with a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 402 and the memory controlling circuit unit 404 may be packaged into one chip, or the connection interface unit 402 is distributed outside of a chip containing the memory controlling circuit unit 404.

The memory controlling circuit unit 404 is configured to execute a plurality of logic gates or control commands which are implemented in a hardware form or in a firmware form, so as to execute operations of writing, reading or erasing data in the rewritable non-volatile memory storage module 406 according to the commands of the host system 11.

The rewritable non-volatile memory module 406 is coupled to the memory controlling circuit unit 404 and configured to store data written from the host system 11. The rewritable non-volatile memory module 406 may be a Single Level Cell (SLC) NAND flash memory module, a Multi Level Cell (MLC) NAND flash memory module (i.e., a flash memory module capable of storing two bits of data in one memory cell), a Triple Level Cell (TLC) NAND flash memory module (i.e., a flash memory module capable of storing three bits of data in one memory cell), other flash memory modules or any memory module having the same features.

Figure 5:
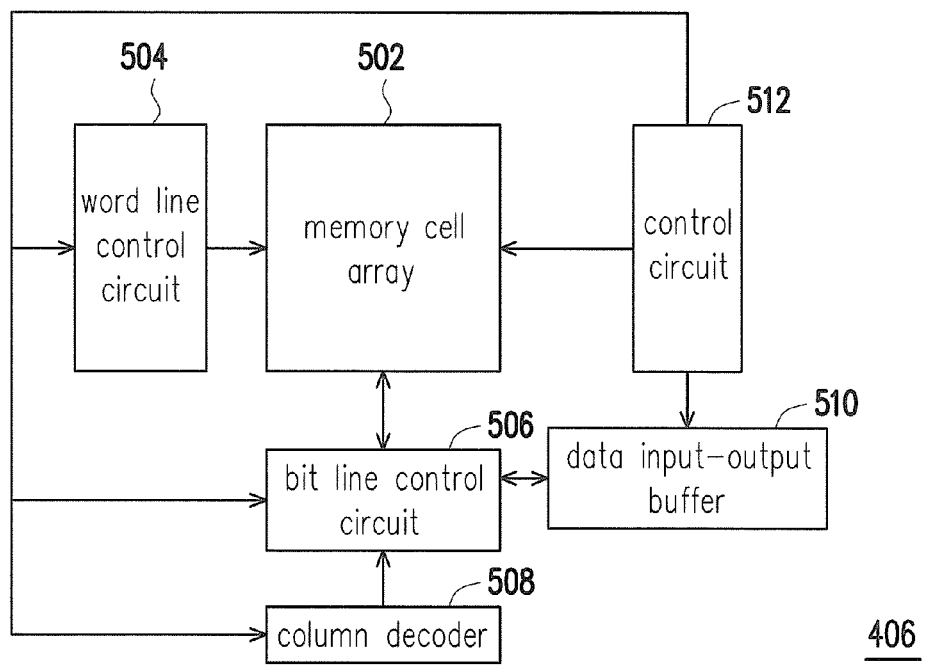
FIG. 5 is a schematic block diagram illustrating a rewritable non-volatile memory module according to an exemplary embodiment of the invention.
Figure 6:
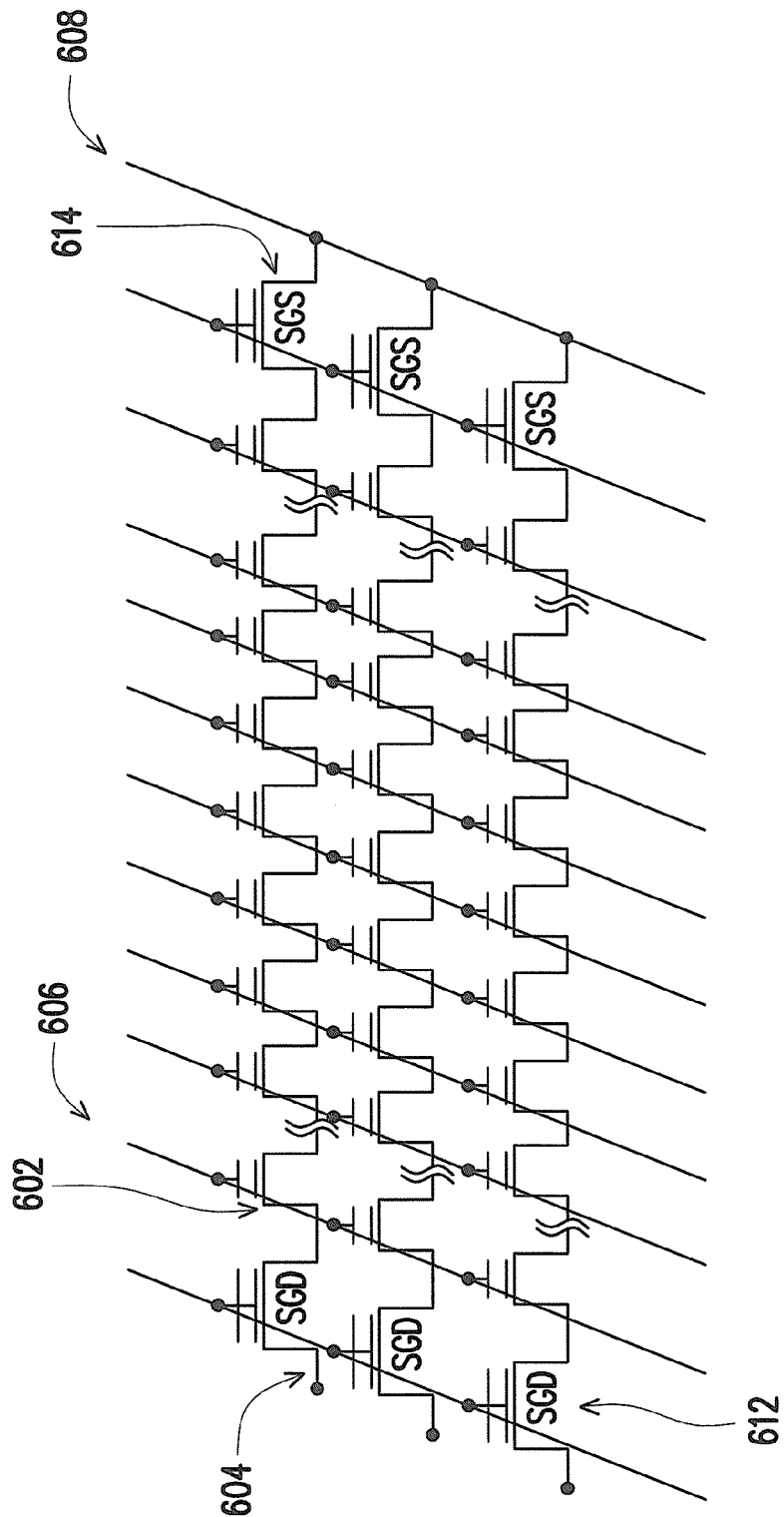
FIG. 6 is a schematic diagram illustrating a memory cell array according to an exemplary embodiment of the invention.

FIG. 5 is a schematic block diagram illustrating a rewritable non-volatile memory module according to an exemplary embodiment of the invention. FIG. 6 is a schematic diagram illustrating a memory cell array according to an exemplary embodiment of the invention.

Referring to FIG. 5, the rewritable non-volatile memory module 406 includes a memory cell array 502, a word line control circuit 504, a bit line control circuit 506, a column decoder 508, a data input-output buffer 510 and a control circuit 512.

In the present exemplary embodiment, the memory cell array 502 may include a plurality of memory cells 602 used to store data, a plurality of select gate drain (SGD) transistors 612, a plurality of select gate source (SGS) transistors 614, as well as a plurality of bit lines 604, a plurality of word lines 606, a common source line 608 connected to the memory cells (as shown in FIG. 6). The memory cell 602 is disposed at intersections of the bit lines 604 and the word lines 606 in a matrix manner (or in a 3D stacking manner). When a write command or a read command is received from the memory controlling circuit unit 404, the control circuit 512 controls the word line control circuit 504, the bit line control circuit 506, the column decoder 508, the data input-output buffer 510 to write the data into the memory cell array 502 or read the data from the memory cell array 502. Among them, the word line control circuit 504 is configured to control voltages applied to the word lines 606; the bit line control circuit 506 is configured to control voltages applied to the bit lines 604; the column decoder 508 is configured to select the corresponding bit line according to a row address in a command; and the data input-output buffer 510 is configured to temporarily store the data.

Each of the memory cells in the rewritable non-volatile memory module 406 may store one or more bits by changing a threshold voltage of the memory cell. More specifically, in each of the memory cells, a charge trapping layer is provided between a control gate and a channel. Amount of electrons in the charge trapping layer may be changed by applying a write voltage to the control gate thereby changing the threshold voltage of the memory cell. This process of changing the threshold voltage is also known as "writing data into the memory cell" or "programming the memory cell". Each of the memory cells in the memory cell array 502 has a plurality of storage statuses depended on changes in the threshold voltage. Moreover, which of the storage statuses is the memory cell belongs to may be determined by read voltages, so as to obtain the one or more bits stored in the memory cell.

Figure 7:
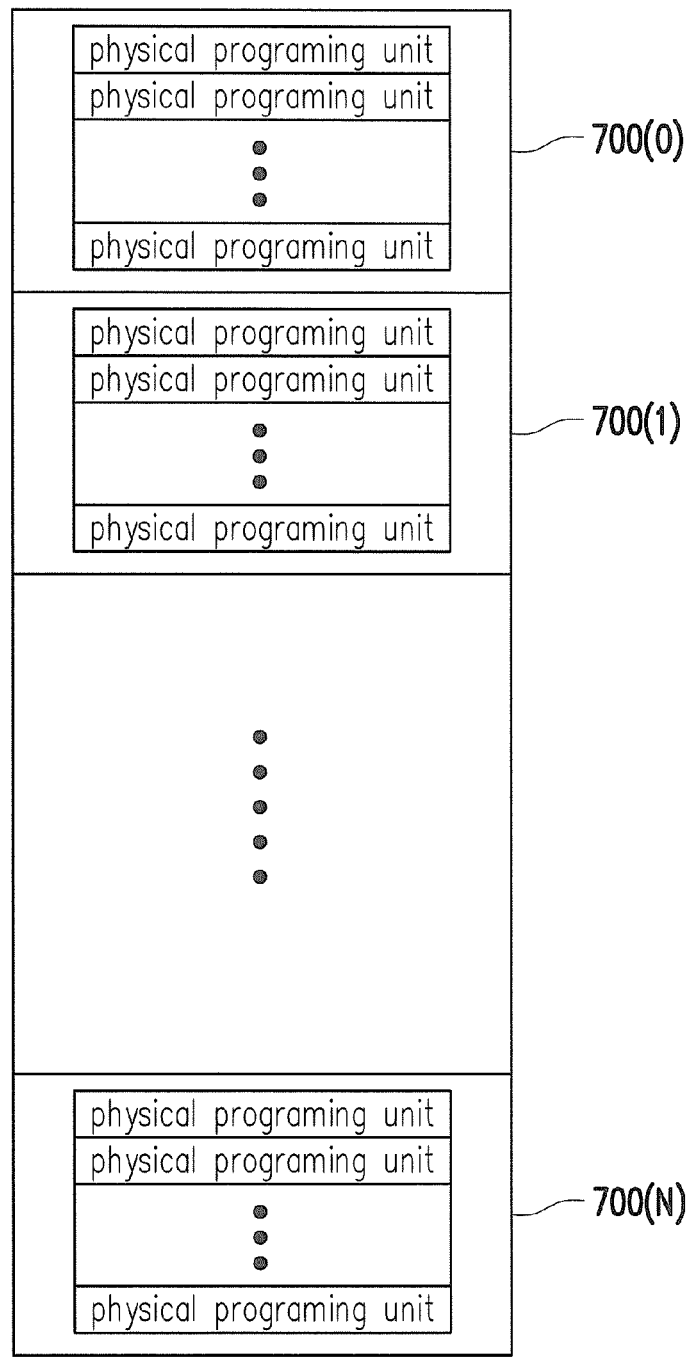
FIG. 7 is a schematic diagram illustrating a rewritable non-volatile memory module according to an exemplary embodiment of the invention.

FIG. 7 is a schematic diagram illustrating a rewritable non-volatile memory module according to an exemplary embodiment of the invention.

Referring to FIG. 7, the memory cells of the rewritable non-volatile memory module 406 constitute a plurality of physical programming units, and the physical programming units constitute a plurality of physical erasing units 700(0) to 700(N). Specifically, the memory cells on the same word line constitute one or more of the physical programming units. If each of the memory cells can store more than two bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is faster than a writing speed of the upper physical programming unit, or a reliability of the lower physical programming unit is higher than a reliability of the upper physical programming unit. In the present exemplary embodiment, the physical programming unit is a minimum unit for programming. That is, the programming unit is the minimum unit for writing data. For example, the physical programming unit is a physical page or a physical sector. When the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, each of the data bit areas contains 32 physical sectors, and a size of each physical sector is 512-byte (B). However, in other exemplary embodiments, the data bit area may also include 8, 16, or more or less of the physical sectors, and amount and sizes of the physical sectors are not limited in the invention. On the other hand, the physical erasing unit is the minimal unit for erasing. Namely, each physical erasing unit contains the least number of memory cells to be erased together. For instance, the physical erasing unit is a physical block.

The rewritable non-volatile memory module 406 may be used in a first programming mode or a second programming mode. For example, one physical programming unit in the rewritable non-volatile memory module 406 used in the first programming mode or the second programming mode means that the memory cells in the physical programming unit is programmed in the first programming mode or the second programming mode. The first programming mode is also known as a multi level cell mode. If one physical programming unit is used in the first programming mode, each of the memory cells in this physical programming unit is stored with bit data of a first amount, in which the first amount is not less than 2. For example, the first amount is 2 or 3. The second programming mode includes at least one of a SLC mode, a lower physical programming mode, a mixture programming mode and a fewer level cell mode. If one physical programming unit is used in the SLC mode, each of memory cells in this physical programming unit is stored with only one bit data. If the rewritable non-volatile memory module 406 is used in the lower physical programming mode, only the physical programming units belonging to the lower physical programming unit in the rewritable non-volatile memory module 406 are programmed, and the upper physical programming unit corresponding to the lower physical programming unit may not be programmed. If the rewritable non-volatile memory module 406 is used in the mixture programming mode, valid data (or real data) are programmed into the physical programming units belonging to the lower physical programming unit without being programmed into the physical programming units belonging to the upper physical programming unit. Yet, invalid data (or dummy data) corresponding to the valid data (or real data) is programmed into the physical programming units belonging to the upper physical programming unit. If one physical programming unit is used in the fewer level cell mode, each of the memory cells in this physical programming unit is stored with bit data of a second amount, and the second amount is less than the first amount. For example, the second amount is 1 or 2. Generally, a speed for programming the physical programming unit in the second programming mode is higher than a speed for programming the physical programming unit in the first programming mode.

Figure 8:
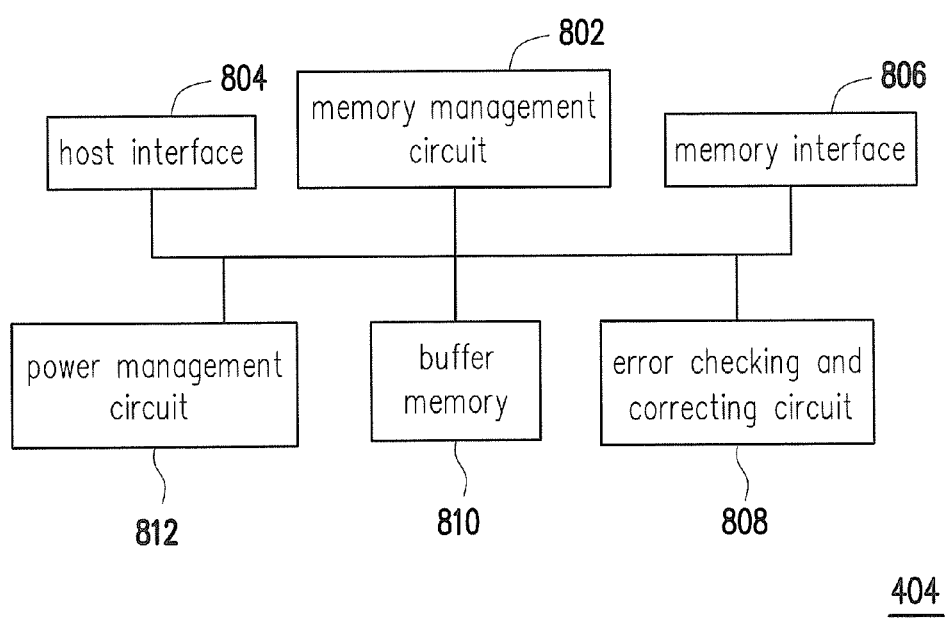
FIG. 8 is a schematic diagram illustrating management of a rewritable non-volatile memory module according to an exemplary embodiment of the invention.

FIG. 8 is a schematic block diagram illustrating a memory controlling circuit unit according to an exemplary embodiment of the invention.

Referring to FIG. 8, the memory controlling circuit unit 404 includes a memory management circuit 802, a host interface 804, a memory interface 806, an error checking and correcting circuit 808 and a buffer memory 810.

The memory management circuit 802 is configured to control overall operations of the memory controlling circuit unit 404. Specifically, the memory management circuit 802 has a plurality of control commands. During operations of the memory storage device 10, the control commands are executed to execute various operations such as writing, reading and erasing data. Operations of the memory management circuit 802 are similar to the operations of the memory controlling circuit unit 404, thus related description is omitted hereinafter.

In the present exemplary embodiment, the control commands of the memory management circuit 802 are implemented in a form of a firmware. For instance, the memory management circuit 802 has a microprocessor unit (not illustrated) and a ROM (not illustrated), and the control commands are burned into the ROM. When the memory storage device 10 operates, the control commands are executed by the microprocessor to execute operations of writing, reading or erasing data.

In another exemplary embodiment, the control commands of the memory management circuit 802 may also be stored as program codes in a specific area (for example, the system area in a memory exclusively used for storing system data) of the rewritable non-volatile memory module 406. In addition, the memory management circuit 802 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 802 when the memory controlling circuit unit 404 is enabled. Thereafter, the control commands are executed by the microprocessor unit to execute operations of writing, reading or erasing data.

Further, in another exemplary embodiment, the control commands of the memory management circuit 802 may also be implemented in a form of hardware. For example, the memory management circuit 802 includes a microcontroller, a memory writing unit, a memory reading unit, a memory erasing unit and a data processing unit. The memory management unit, the memory writing unit, the memory reading unit, the memory erasing unit and the data processing unit are coupled to the microprocessor. The memory management unit is configured to manage the physical erasing units of the rewritable non-volatile memory module 406; the memory writing unit is configured to issue a write command to the rewritable non-volatile memory module 406 in order to write data to the rewritable non-volatile memory module 406; the memory reading unit is configured to issue a read command to the rewritable non-volatile memory module 406 in order to read data from the rewritable non-volatile memory module 406; the memory erasing unit is configured to issue an erase command to the rewritable non-volatile memory module 406 in order to erase data from the rewritable non-volatile memory module 406; the data processing unit is configured to process both the data to be written to the rewritable non-volatile memory module 406 and the data to be read from the rewritable non-volatile memory module 406.

The host interface 804 is coupled to the memory management circuit 802 and configured to receive and identify commands and data sent from the host system 11. In other words, the commands and data sent from the host system 11 are passed to the memory management circuit 802 through the host interface 804. In the present exemplary embodiment, the host interface 804 is compatible with a SATA standard. However, it should be understood that the present invention is not limited thereto, and the host interface 804 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 806 is coupled to the memory management circuit 802 and configured to access the rewritable non-volatile memory module 406. That is, data to be written to the rewritable non-volatile memory module 406 is converted to a format acceptable to the rewritable non-volatile memory module 406 through the memory interface 806. Specifically, if the memory management circuit 802 intends to access the rewritable non-volatile memory module 406, the memory interface 806 sends corresponding command sequences. The command sequences may include one or more signals, or data from the bus. For example, in a read command sequence, information such as identification codes and memory addresses are included.

The error checking and correcting circuit 808 is coupled to the memory management circuit 802 and configured to execute an error checking and correcting process to ensure the correctness of data. Specifically, when the memory management circuit 802 receives the write command from the host system 11, the error checking and correcting circuit 808 generates an error correcting code (ECC) and/or an error detecting code (EDC) for data corresponding to the write command, and the memory management circuit 802 writes data and the ECC and/or the EDC corresponding to the write command to the rewritable non-volatile memory module 406. Subsequently, when the memory management circuit 802 reads the data from the rewritable non-volatile memory module 406, the corresponding ECC and/or the EDC is also read, and the error checking and correcting circuit 808 executes the error checking and correcting procedure on the read data based on the ECC and/or the EDC.

The buffer memory 810 is coupled to the memory management circuit 802 and configured to temporarily store data and commands from the host system 11 or data from the rewritable non-volatile memory module 406.

In an exemplary embodiment, the memory controlling circuit unit 404 further includes a power management circuit 712. The power management unit 712 is coupled to the memory management circuit 802 and configured to control a power of the memory storage device 10.

In the present exemplary embodiment, a low density parity code (LDPC) is used by the error checking and correcting circuit 808. However, in another exemplary embodiment, the error checking and correcting circuit 808 may also use a BCH code, a convolutional code, a turbo code, which are not particularly limited in the invention.

In the present exemplary embodiment, the error checking and correcting circuit 808 encodes and decodes according to a low density parity check algorithm. In the low density parity code, a valid codeword is defined by a parity check matrix. The parity check matrix is marked as a matrix H and a codeword is marked as CW hereinafter. According to an equation (1) below, if a result calculated by multiplying the parity check matrix H by the codeword CW is a zero vector, it indicates that the codeword CW is the valid codeword. Therein, an operator $\otimes$ represents a mod 2 matrix multiplication. In other words, a null space of the matrix H includes all the valid codewords. However, a content of the codeword CW is not particularly limited in the invention. For instance, the codeword CW may also include the error correcting code or the error detecting code generated by using any algorithm.

$$H \otimes CW^T = 0 \qquad (1)$$

Therein, a dimension of the matrix H is m-by-n, and a dimension of the codeword CW is 1-by-n. Therein, m and n are positive integers. The codeword CW includes message bits and parity bits. Namely, the codeword CW may be represented by [M P], in which a vector M is constituted by the message bits, and a vector P is constituted by the parity bits. A dimension of the vector M is 1-by-(n−m), and a dimension of the vector P is 1-by-m. Hereinafter, the message bits and the parity bits are collectively known as data bits. In other words, the codeword CW includes n bits, in which a length of the message bits is (n−m) bits, and a length of the parity bits is m bits. Namely, a code rate of the codeword CW is (n−m)/n.

Generally, a generation matrix (marked as G) is used during decoding, so that an equation (2) below may be satisfied by arbitrary values of the vector M. Therein, a dimension of the generation matrix G is (n−m)-by-n.

$$M \otimes G = [MP] = CW \qquad (2)$$

Therein, the codeword CW generated by the equation (2) is the valid codeword. Therefore, when the equation (2) is substituted into the equation (1), an equation (3) below may be obtained accordingly.

$$H \otimes G^T \otimes M^T = 0 \qquad (3)$$

Since the vector M may be arbitrary values, an equation (4) below may definitely be satisfied. In other words, after the parity check matrix H is decided, the corresponding generation matrix G may also be decided.

$$H \otimes G^T = 0 \qquad (4)$$

When decoding the codeword CW, a parity check procedure is first performed on the data bits in the codeword. For instance, the parity check matrix H may be multiplied by the codeword CW to generate a vector (hereinafter, marked as S, as shown in an equation (5) below). If the vector S is the zero vector, the codeword CW may be directly outputted. If the vector S is not the zero vector, it indicates that the codeword CW is not the valid codeword.

$$H \otimes CW^T = S \qquad (5)$$

A dimension of the vector S is m-by-1, in which each element is also known as a syndrome. If the codeword CW is not the valid codeword, the error checking and correcting circuit 808 may execute a decoding procedure attempting to correct an error bit in the codeword CW. In an exemplary embodiment, the decoding procedure executed by the error checking and correcting circuit 808 is an iteration decoding procedure. In other words, the decoding procedure is repeatedly executed until the codeword is successfully decoded or a number of executions reaches a preset threshold. If the codeword is decoded successfully, it indicates the decoding successes; otherwise, it indicates that the decoding fails. For example, when a number of times for executing the decoding procedure for the codeword CW reaches aforesaid preset threshold, if the error bits in the codeword CW is still not confirmed, it indicates that the decoding for the codeword CW by the error checking and correcting circuit 808 fails.

In the present exemplary embodiment, when the decoding for one specific codeword fails, the memory management circuit 802 adjusts a read voltage, and uses the adjusted read voltage to obtain another codeword. For example, in the case where the read voltage originally used to read one specific physical programming unit is a preset read voltage, when the decoding for the read data fails, the memory management circuit 802 instructs the rewritable non-volatile memory module 406 to use another read voltage different from the preset read voltage to read the memory cells in this physical programming unit again in order to obtain another codeword. After the another codeword is obtained, the error checking and correcting circuit 808 executes the decoding for the another codeword; if the decoding successes, the error checking and correcting circuit 808 outputs the codeword; and if the decoding fails, the memory management circuit 802 repeatedly executes aforesaid operation of adjusting the read voltage until a number of times for decoding or switching the read voltage reaches a preset number of times.

Figure 9:
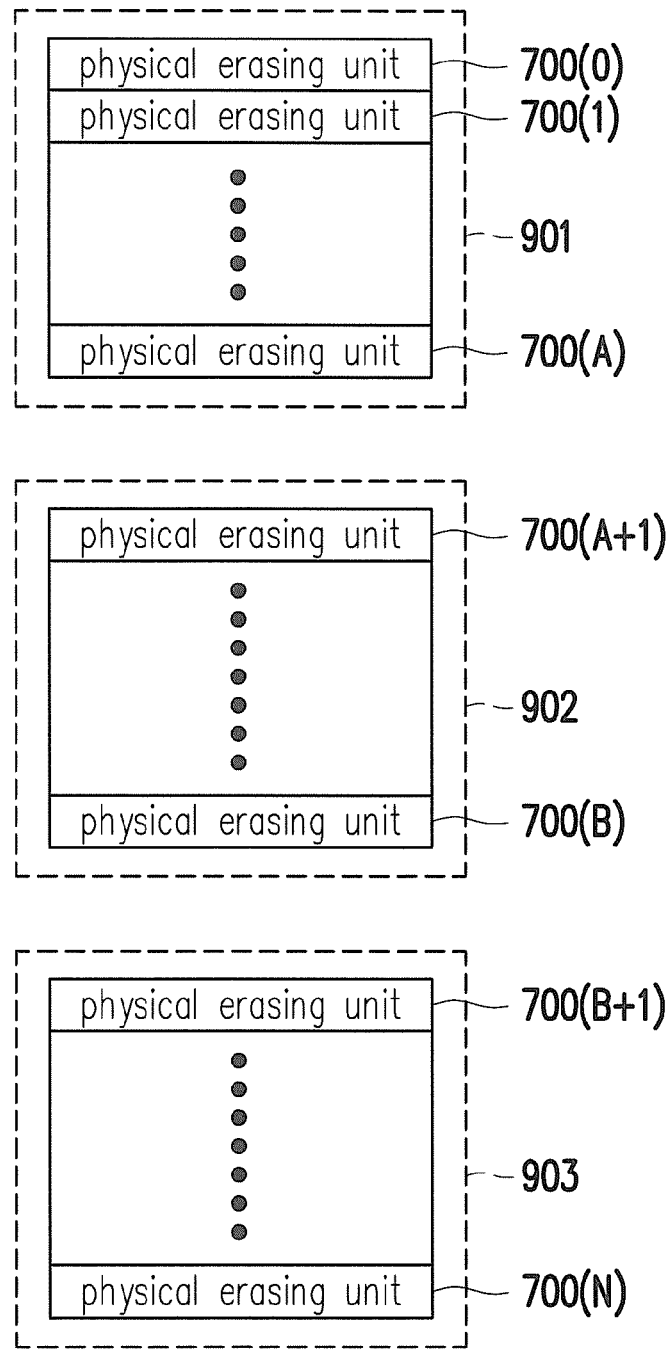
FIG. 9 is a schematic diagram illustrating management of a rewritable non-volatile memory module according to an exemplary embodiment of the invention.

FIG. 9 is a schematic diagram illustrating management of a rewritable non-volatile memory module according to an exemplary embodiment of the invention. It should be understood that terms, such as "select", "group", "divide", "associate" and so forth, are logical concepts which describe operations in the physical erasing units of the rewritable non-volatile memory module 406. That is, the physical erasing units of the rewritable non-volatile memory module 406 are logically operated, but actual positions of the physical units of the rewritable non-volatile memory module are not changed.

Referring to FIG. 8, the memory management circuit 802 may logically divide the physical erasing units 700(0) to 700(N) of the rewritable non-volatile memory module 406 into a plurality of areas such as a buffer area 901, a storage area 902 and a system area 903.

The physical erasing units 700(0) to 700(A) in the buffer area 901 are configured to temporarily store data that the host system 11 intends to write or receive. For example, after the data to be written into the storage area 902 by the host system 11 is received by the memory management circuit 802, such data is temporarily stored in the buffer memory 810; and later, such data is transmitted to the buffer area 901 from the buffer memory 810 and copied to the storage area 902 from the buffer area 901. For example, after one data is read from the storage area 902 by the memory management circuit 802, such data is temporarily stored in the buffer area 901; and later, such data is transmitted to the buffer memory 810 from the buffer area 901 and transmitted to the host system 11 from the buffer memory 810.

The physical erasing units 700(A+1) to 700(B) in the storage area 902 are configured to store the data from the host system 11. The storage area 902 stores valid data and invalid data. For example, when the host system 11 intends to delete one valid data, the data being deleted may still be stored in the storage area 902 but marked as the invalid data. The physical erasing unit not storing the valid data is also known as a spare physical erasing unit. For example, the physical erasing unit being erased may become the spare physical erasing unit. If there are damaged physical erasing units in the buffer area 901, the storage area 902 or the system area 903, the physical erasing units in the buffer area 901 or the storage area 902 may also be used to replace the damaged physical erasing units. If there are no available physical erase units in the buffer area 901 and the storage area 902 for replacing the damaged physical erasing units, the memory management circuit 802 can announce that the memory storage device 10 is in a write protect status, so that data can no longer be written therein.

The physical erasing units 700(B+1) to 700(N) in the system area 903 are configured to record system information including information related to manufacturer and model of a memory chip, a number of physical erasing units in the memory chip, a number of the physical programming unit in each physical erasing unit, and so forth.

Amounts of the physical erasing units in the buffer area 901, the storage area 902 and the system area 903 may be different based on the different memory specifications. In addition, it should be understood that, during the operation of the memory storage device 10, grouping relations of the physical erasing units associated to the buffer area 901, the storage area 902 and the system area 903 may be dynamically changed. For example, when damaged physical erasing units in the system area 903 are replaced by the physical erasing units in the storage area 902, the physical erasing units originally from the storage area 902 are then associated to the system area 903.

In the present exemplary embodiment, the physical erasing units in the buffer area 901 are used in the second programming mode, and the physical erasing units in the storage area 902 are used in the first programming mode. However, in another exemplary embodiment, the physical erasing units in the buffer area 901 may also be used in the first programming mode, and/or the physical erasing units in the storage area 902 may also used in the second programming mode. In addition, the physical erasing units in the system area 903 may also be used in the first programming mode or the second programming mode, which are not particularly limited in the invention. Furthermore, it is also possible that the buffer area 901 is not divided. For example, in an exemplary embodiment, the physical erasing units 700(0) to 700(N) are merely divided into the storage area 902 and the system area 903; and accordingly, the data may be directly transmitted to the storage area 902 from the buffer memory 810 or directly transmitted to the buffer memory 810 from the storage area 902. Alternatively, in another exemplary embodiment, the amount of the buffer area 901 may also be more, which is not particularly limited in the invention.

In the present exemplary embodiment, the memory management circuit 802 sets a multi trigger queue (MTQ). For example, the multi trigger queue is stored in the buffer memory 810. The memory management circuit 802 receives one read command (also known as a first read command) from the host system 11. The memory management circuit 802 sets a plurality of read events (also known as first read events) in the multi trigger queue according to the first read command. The first read events include one general read event and at least one cache read event. Data to be read corresponding to the general read event and data to be read corresponding to each cache read event belong to continuous data, the data to be read corresponding to the general read event is requested by the first read command, and the data to be read corresponding to each cache read event is not requested by the first read command. In other words, the cache read event instructs to execute a pre-read operation. Because the data to be read corresponding to the general read event and the data to be read corresponding to each cache read event belong to the continuous data, a starting logical address of the data to be read corresponding to a foremost one arranged in the cache read events follows after an ending logical address of the data to be read corresponding to the general read event; a starting logical address of the data to be read corresponding to a second cache read event arranged in the cache read events follows after an ending logical address of the data to be read corresponding to the foremost one arranged in the cache read events; a starting logical address of the data to be read corresponding to a third cache read event arranged in the cache read events follows after an ending logical address of the data to be read corresponding to the second cache read event arranged in the cache read events, and the rest may be deduced by analogy. According to an arrangement of the first read events in the multi trigger queue, from front to back, the data requested by the first read command and a plurality of pre-read data are sequentially read.

The memory management circuit 802 sends at least one read command sequence (also known as a first read command sequence) to the rewritable non-volatile memory module 406 according to at least one of the first read events and receives data (also known as first data) from the rewritable non-volatile memory module 406 in response to the first read command sequence. Herein, the first read command sequence includes at least one instruction code or program code and instructs to read the first data from the storage area 902. After the first data is received, the first data is temporarily stored in the buffer memory 810 and a decoding for the first data is performed by the error checking and correcting circuit 808. Methods regarding how to decode by the error checking and correcting circuit 808 have been described above, which are not repeated hereinafter. In another exemplary embodiment, the first data may also be transmitted to the error checking and correcting circuit 808 first for decoding and temporarily stored in the buffer memory 810 only when the decoding successes; and if the decoding fails, the first data is not temporarily stored in the buffer memory 810.

The memory management circuit 802 determines whether the decoding for the first data fails. If the decoding for the first data fails, the memory management circuit 802 resets the multi trigger queue, sends at least one read command sequence (also known as a second read command sequence) to the rewritable non-volatile memory module 406 according to at least one read event (also known as a second read event) in the reset multi trigger queue, and receives data (also known as second data) from the rewritable non-volatile memory module 406 in response to the second read command sequence. Herein, the second read command sequence includes at least one instruction code or program code and instructs to read the second data from the storage area 902. After the second data is received, the second data is temporarily stored in the buffer memory 810 and a decoding for the second data is performed by the error checking and correcting circuit 808. In another exemplary embodiment, the second data may also be transmitted to the error checking and correcting circuit 808 first for decoding and temporarily stored in the buffer memory 810 only when the decoding successes; and if the decoding fails, the second data is not temporarily stored in the buffer memory 810. Particularly, the second read event includes at least one of the at least one cache read event (also known as a first cache read event).

It is worth mentioning that, in the present exemplary embodiment, when the multi trigger queue is reset, the memory management circuit 802 sets a read event corresponding to a data which is decoding failure in the first read events to be a pending event. Therein, the pending event is a foremost read event arranged in the at least one second read event. Accordingly, the read event corresponding to the data decoding failure is executed again in the reset multi trigger queue.

If the decoding for the first data does not fail, the memory management circuit 802 transmits data requested by the first read command in the first data to the host system 11 from the buffer memory 810. If there is at least one read event (also known as a third read event) not yet executed in the first read events, the memory management circuit 802 sends at least one read command sequence (also known as a third read command sequence) to the rewritable non-volatile memory module 406 according to the third read event and receives data (also known as third data) from the rewritable non-volatile memory module 406 in response to the third read command sequence. Herein, the third read command sequence includes at least one instruction code or program code and instructs to read the third data from the storage area 902. After the third data is received, the third data is temporarily stored in the buffer memory 810 and a decoding for the third data is performed by the error checking and correcting circuit 808. In another exemplary embodiment, the third data may also be transmitted to the error checking and correcting circuit 808 first for decoding and temporarily stored in the buffer memory 810 only when the decoding successes; and if the decoding fails, the third data is not temporarily stored in the buffer memory 810. Particularly, the third read event includes at least one of the at least one cache read event (also known as a second cache read event). In another exemplary embodiment, if the first data is already last data to be read as instructed by the first read events, the memory management circuit 802 does not transmit the third read command sequence.

After the third data is received, the memory management circuit 802 determines whether the decoding for the third data fails. If the decoding for the third data fails, the memory management circuit 802 resets the multi trigger queue, sends at least one read command sequence (also known as a fourth read command sequence) according to at least one read event (also known as a fourth read event) in the reset multi trigger queue, and receives data (also known as fourth data) from the rewritable non-volatile memory module 406 in response to the fourth read command sequence. Herein, the fourth read command sequence includes at least one instruction code or program code and instructs to read the fourth data from the storage area 902. After the fourth data is received, the fourth data is temporarily stored in the buffer memory 810 and a decoding for the fourth data is performed by the error checking and correcting circuit 808. In another exemplary embodiment, the fourth data may also be transmitted to the error checking and correcting circuit 808 first for decoding and temporarily stored in the buffer memory 810 only when the decoding successes; and if the decoding fails, the fourth data is not temporarily stored in the buffer memory 810. Particularly, the fourth read event includes at least one of the at least one cache read event (also known as a third cache read event).

On the other hand, after the second data is received, the memory management circuit 802 determines whether the decoding for the second data fails. If the decoding for the second data fails, the memory management circuit 802 resets the multi trigger queue again, sends at least one read command sequence (also known as a fifth read command sequence) according to at least one read event (also known as a fifth read event) in the reset multi trigger queue, and receives data (also known as fifth data) from the rewritable non-volatile memory module 406 in response to the fifth read command sequence. Herein, the fifth read command sequence includes at least one instruction code or program code and instructs to read the fifth data from the storage area 902. After the fifth data is received, the fifth data is temporarily stored in the buffer memory 810 and a decoding for the fifth data is performed by the error checking and correcting circuit 808. In another exemplary embodiment, the fifth data may also be transmitted to the error checking and correcting circuit 808 first for decoding and temporarily stored in the buffer memory 810 only when the decoding successes; and if the decoding fails, the fifth data is not temporarily stored in the buffer memory 810. Particularly, the fifth read event includes at least one of the at least one cache read event (also known as a fourth cache read event).

That is to say, if the decoding for one specific data doe not fail, the memory management circuit 802 determines whether there are read events not yet executed in the multi trigger queue. If yes, according to the read events not yet executed in the multi trigger queue, more data are read, corresponding decoding procedures are performed and the multi trigger queue may be reset based on whether the decoding fails, which are not repeated hereinafter.

After the first read command is received, the memory management circuit 802 may receive another read command (also known as a second read command). The memory management circuit 802 determines whether data requested by the second read command is included in the first data, the second data, the third data or the fourth data. If the data requested by the second read command is included in the first data, the second data, the third data or the fourth data, the memory management circuit 802 transmits the data requested by the second read command to the host system 11 from the buffer memory 810. Accordingly, a speed for reading data may be accelerated.

FIG. 10a to FIG. 10d are schematic diagrams for reading data according to an exemplary embodiment of the invention.

Figure 10A:
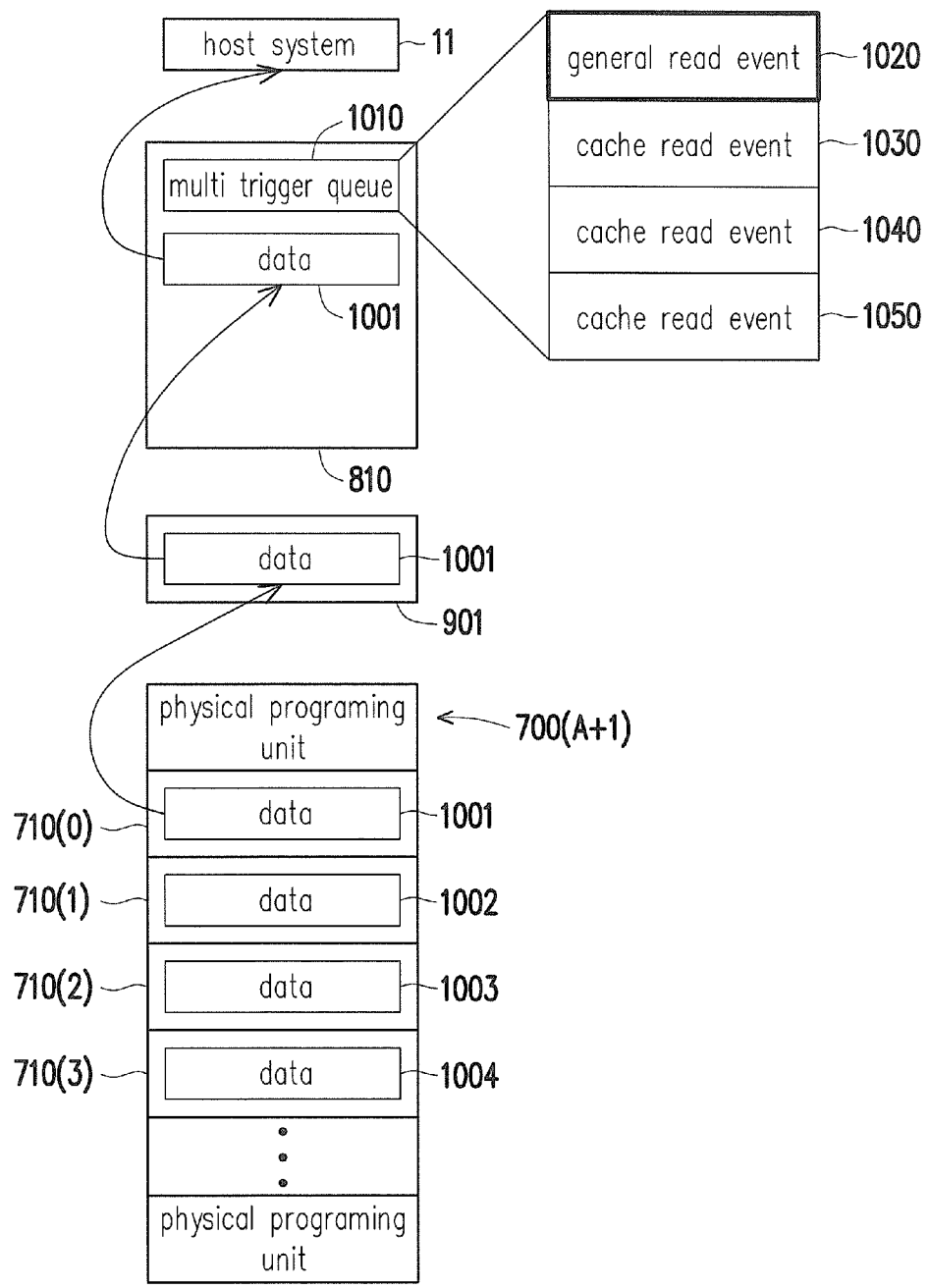
FIG. 10a to FIG. 10d are schematic diagrams for reading data according to an exemplary embodiment of the invention.

Referring to FIG. 10a, after the first read command is received, a plurality of read events are set in a multi trigger queue 1010 (e.g., a general read event 1020 and cache read events 1030 to 1050). The general read event 1020 instructs to read data requested by the first read command, and the cache read events 1030 to 1050 instruct to read data not requested by the first read command. In other words, the cache read events 1030 to 1050 are instructions not triggered by the host system 11 but triggered by the memory management circuit 802 for executing the pre-read operation. Therein, the data to be read as instructed by the general read event 1020 and the cache read event 1030 to 1050 belong to continuous data. The definition of the continuous data has been described above, which is not repeated hereinafter. It is worth mentioning that, it is illustrated herein by setting one general read event and a plurality of cache read events according to one read command for example. However, in another exemplary embodiment, it is also possible that a plurality of general read events and a plurality of cache read events are set according to one read command, which is not particularly limited in the invention. Therein, if a plurality of general read event are set according to one read command, data to be read corresponding to these general read events all belong to data requested by such read command. In addition, an amount of the cache read events that can be set in the multi trigger queue 1010 may be more or less. For example, the amount of the cache read events that can be set in the multi trigger queue 1010 may be decided according to a capacity of the buffer memory 810 and/or a capacity of the buffer area 901. If the capacity of the buffer memory 810 and/or the capacity of the buffer area 901 are greater, the amount of the cache read events that can be set in the multi trigger queue 1010 may also be more; and if the capacity of the buffer memory 810 and/or the capacity of the buffer area 901 are smaller, the amount of the cache read events that can be set in the multi trigger queue 1010 may also be less.

In the present exemplary embodiment, the general read event 1020 is arranged at a foremost place, and the cache read events 1030 to 1050 are arranged after the corresponding general read event 1020, as shown in FIG. 10a. In other words, regarding the execution sequence, the general read event 1020 is executed first; then, the cache read event 1030 is executed; then, the cache read event 1040 is executed; and lastly, the cache read event 1050 is executed. In the present exemplary embodiment, one pointer may be used to indicate which of the read events in the multi trigger queue 1010 is currently executed. Further, after one read event is executed, the pointer moves down to indicate the next read event to be executed. However, during a process of executing the read events, if the multi trigger queue 1010 is reset, a previously executed read event is repeatedly executed. For example, if the multi trigger queue 1010 is reseted, said pointer stays at the previously executed read event instead of moving down.

As shown in FIG. 10a, it is assumed that the first read command requests for data 1001 of one specific logical address. In this case, according to the general read event 1020, the data 1001 is read to the buffer area 901 from the physical programming unit 710(0). The data 1001 is transmitted to the buffer memory 810 from the buffer area 901, and a decoding for the data 1001 is executed by the error checking and correcting circuit 808. In the case where the data 1001 can be decoded successfully, the decoded data 1001 is transmitted to the host system 11, and the cache read event 1030 is the next to be executed.

Figure 10B:
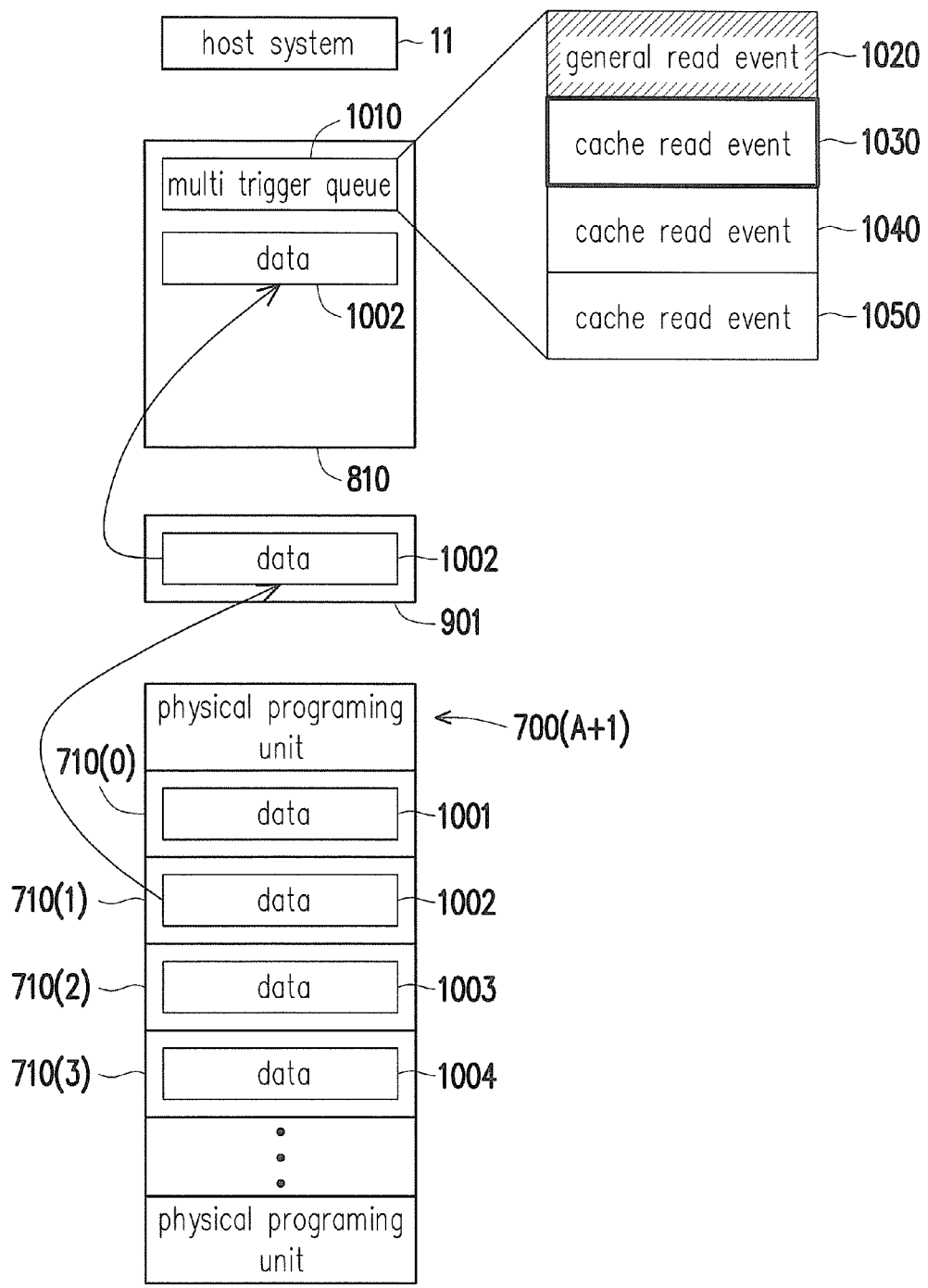

Referring to FIG. 10b, according to the cache read event 1030, data 1002 is read to the buffer area 901 from the physical programming unit 710(1). The data 1002 is transmitted to the buffer memory 810 from the buffer area 901, and a decoding for the data 1002 is executed by the error checking and correcting circuit 808. In the case where the data 1002 can be decoded successfully, the decoded data 1002 is temporarily stored in the buffer memory 810, and the cache read event 1040 is the next to be executed. Later, if a read command requested for reading the data 1002 is received, the data 1002 may be instantly transmitted to the host system 11 from the buffer memory 810.

Figure 10C:
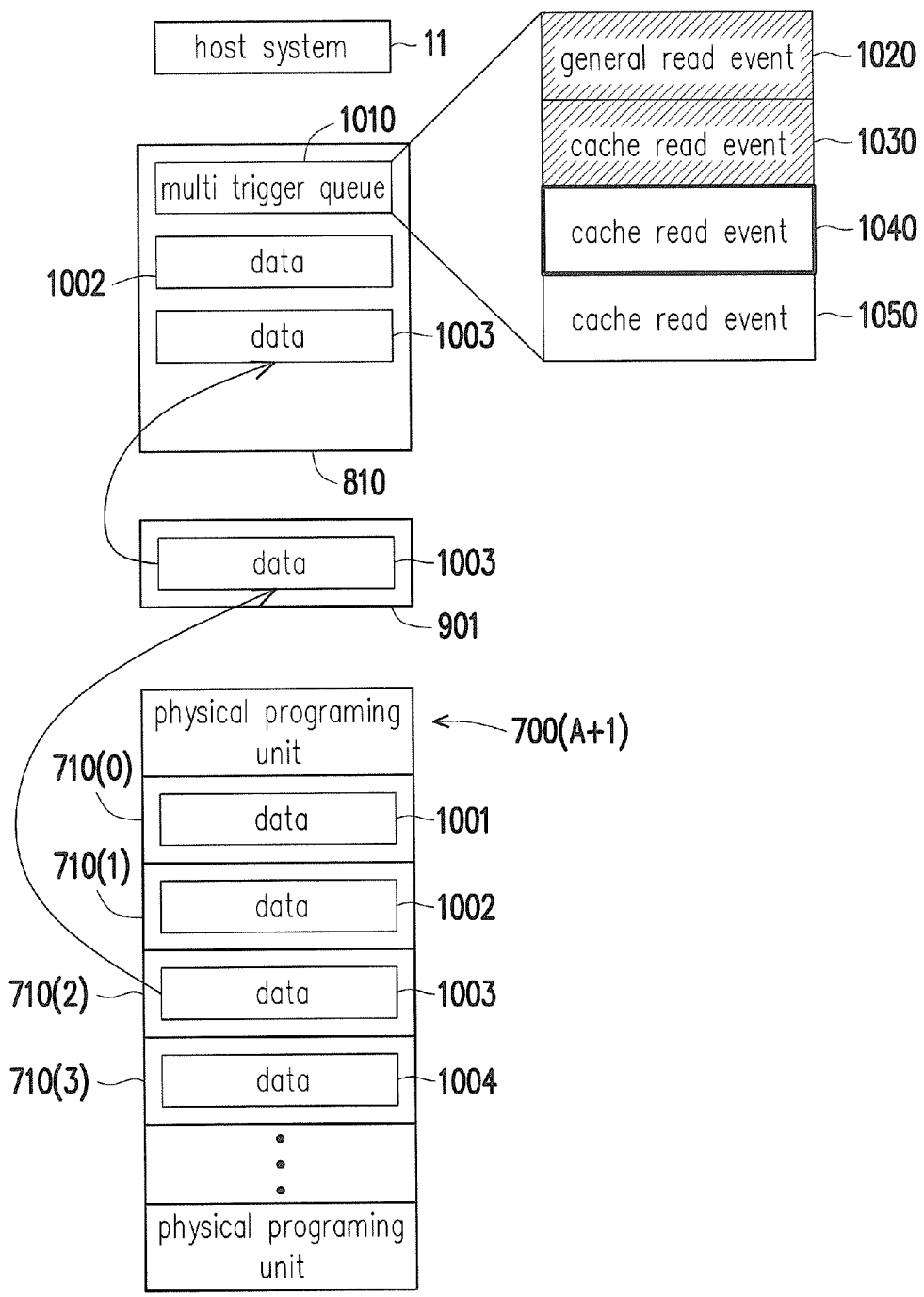

Referring to FIG. 10c, according to the cache read event 1040, data 1003 is read to the buffer area 901 from the physical programming unit 710(2). The data 1003 is transmitted to the buffer memory 810 from the buffer area 901, and a decoding for the data 1003 is executed by the error checking and correcting circuit 808. In the case where the data 1003 can be decoded successfully, the decoded data 1003 is temporarily stored in the buffer memory 810, and the cache read event 1050 is the next to be executed. Later, if a read command requested for reading the data 1003 is received, the data 1003 may be instantly transmitted to the host system 11 from the buffer memory 810.

Figure 10D:
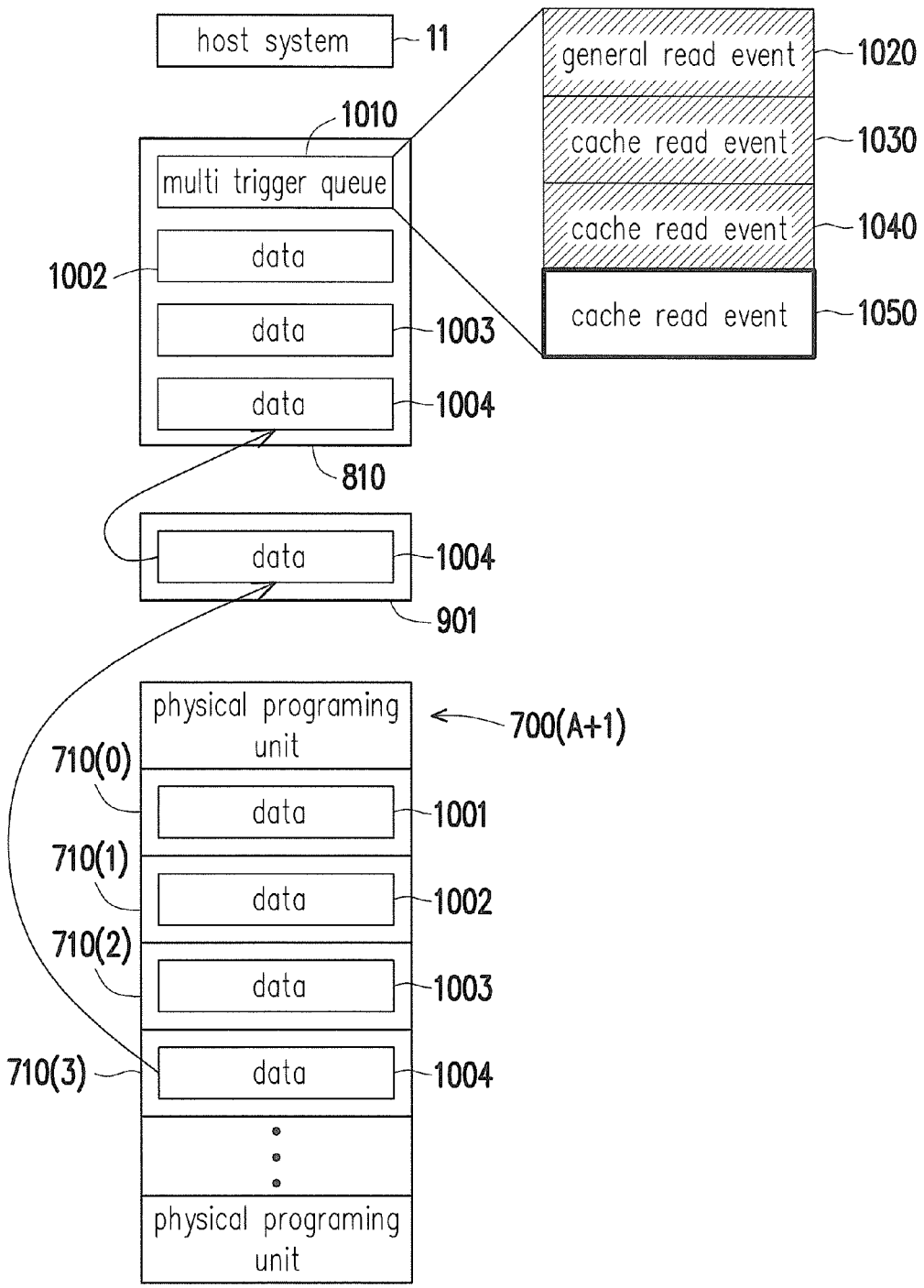

Referring to FIG. 10d, according to the cache read event 1050, data 1004 is read to the buffer area 901 from the physical programming unit 710(3). The data 1004 is transmitted to the buffer memory 810 from the buffer area 901, and a decoding for the data 1004 is executed by the error checking and correcting circuit 808. In the case where the data 1004 can be decoded successfully, the decoded data 1004 is temporarily stored in the buffer memory 810. Later, if a read command requested for reading the data 1004 is received, the data 1004 may be instantly transmitted to the host system 11 from the buffer memory 810.

FIG. 11a to FIG. 11f are schematic diagrams for reading data according to an exemplary embodiment of the invention.

Figure 11A:
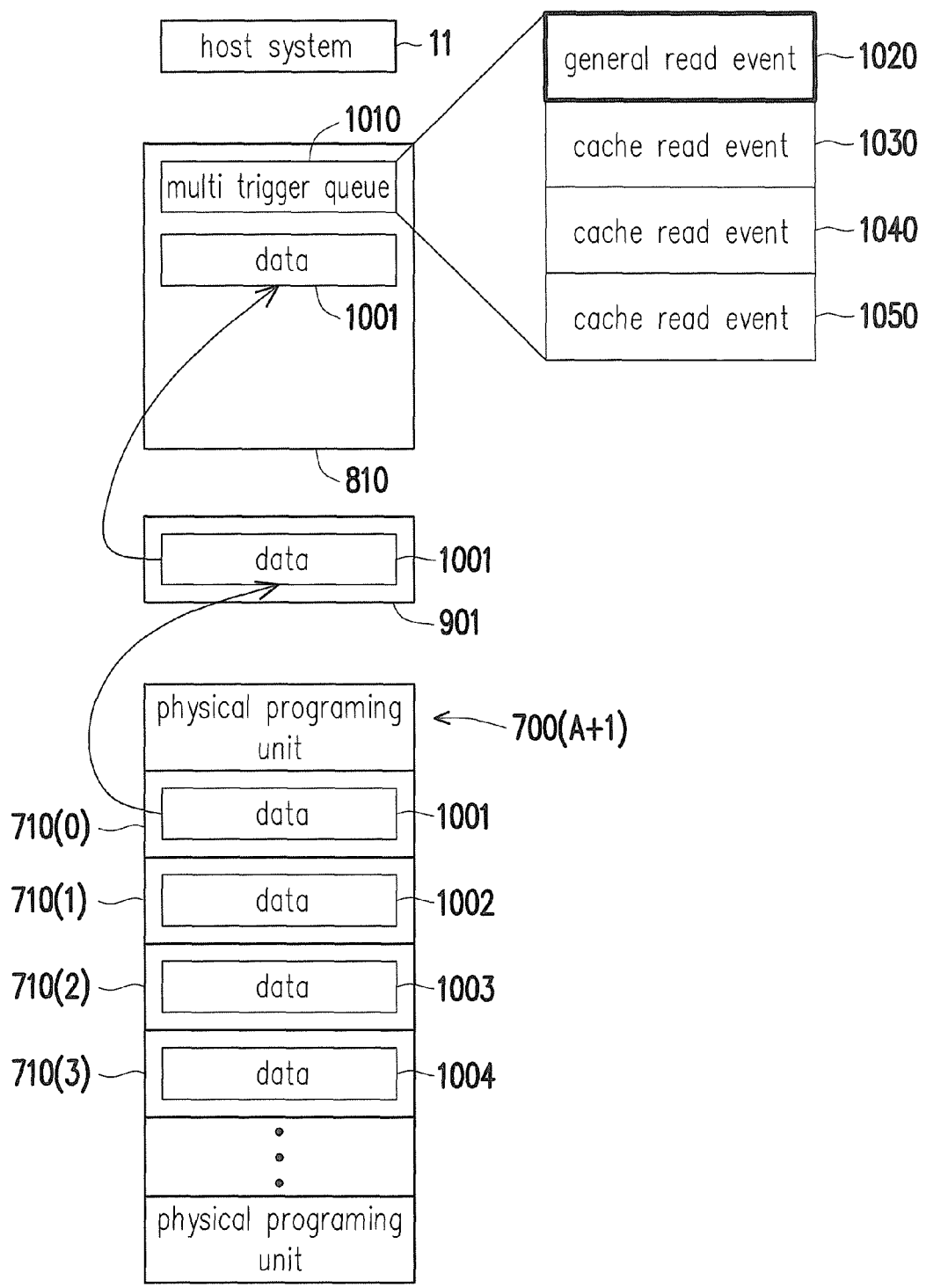
FIG. 11a to FIG. 11f are schematic diagrams for reading data according to an exemplary embodiment of the invention.

Referring to FIG. 11a, according to the first read command, a plurality of read events are also set in a multi trigger queue 1010 (e.g., a general read event 1020 and cache read events 1030 to 1050). It is assumed that the first read command requests for data 1001 of one specific logical address. In this case, according to the general read event 1020, the data 1001 is read to the buffer area 901 from the physical programming unit 710(0). The data 1001 is transmitted to the buffer memory 810 from the buffer area 901, and a decoding for the data 1001 is executed by the error checking and correcting circuit 808. In the case where the decoding for the data 1001 fails, the multi trigger queue 1010 is reset, and the general read event 1020 is executed again.

Figure 11B:
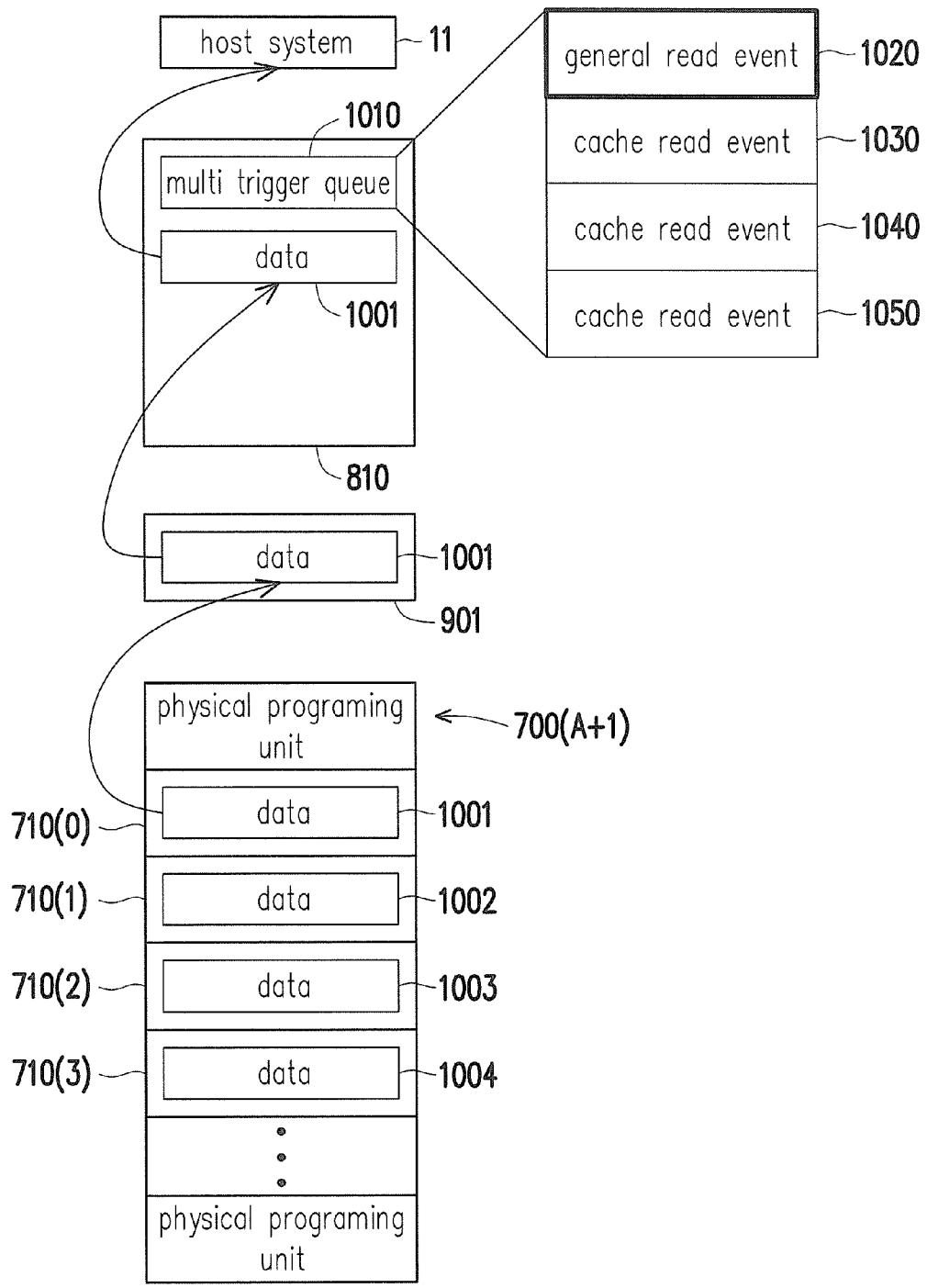

Referring to FIG. 11b, according to the reset multi trigger queue 1010, the data 1001 is read to the buffer area 901 from the physical programming unit 710(0) again. The data 1001 is transmitted to the buffer memory 810 from the buffer area 901, and a decoding for the data 1001 is executed by the error checking and correcting circuit 808. In the case where the data 1001 being read again is decoded successfully, the data 1001 is transmitted to the host system 11 from the buffer memory 810, and the cache read event 1030 is the next to be executed.

Figure 11C:
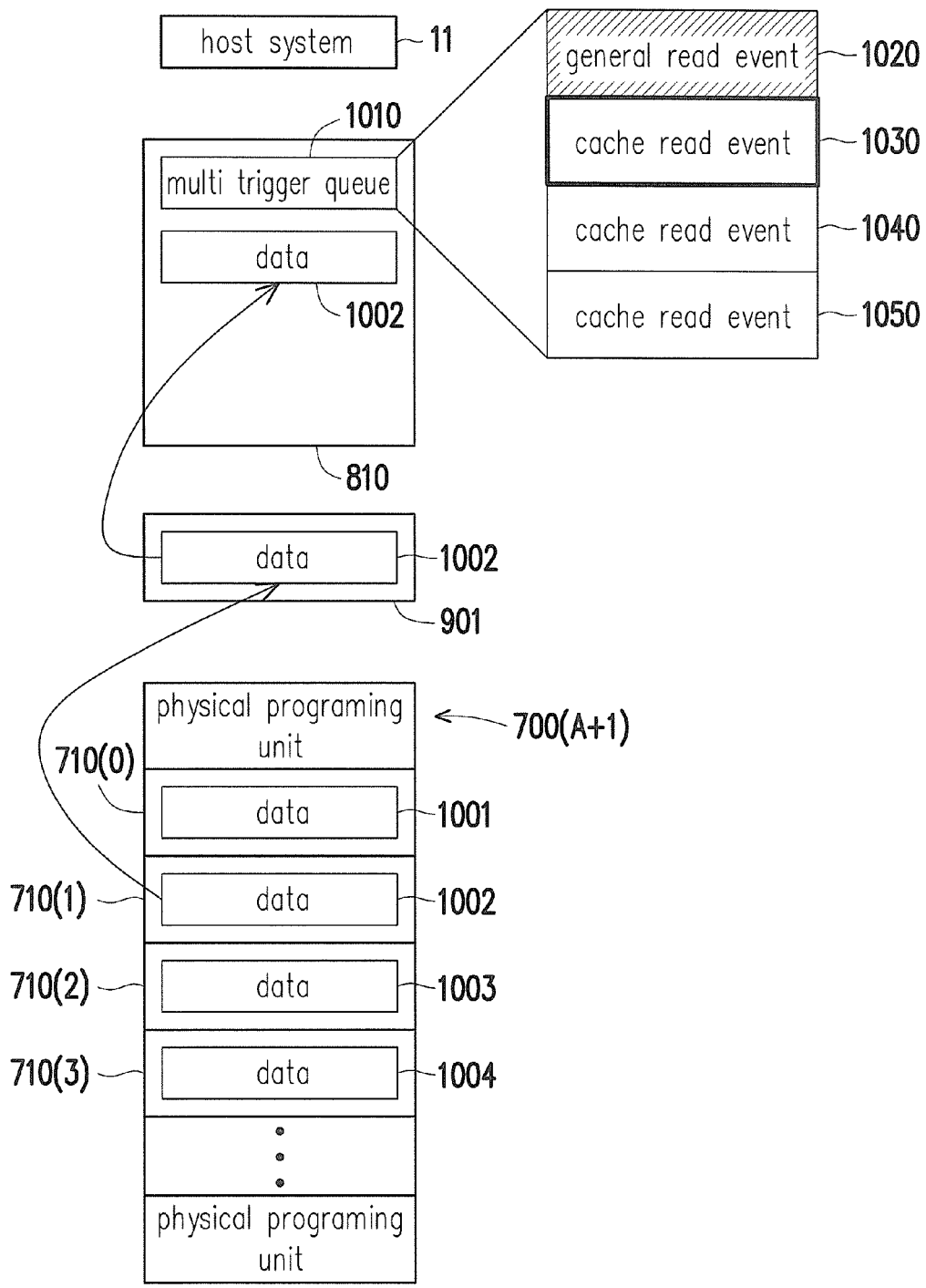

Referring to FIG. 11c, according to the cache read event 1030, data 1002 is read to the buffer area 901 from the physical programming unit 710(1). The data 1002 is transmitted to the buffer memory 810 from the buffer area 901, and a decoding for the data 1002 is executed by the error checking and correcting circuit 808. In the case where the data 1002 can be decoded successfully, the decoded data 1002 is temporarily stored in the buffer memory 810, and the cache read event 1040 is the next to be executed. Later, if a read command requested for reading the data 1002 is received, the data 1002 may be instantly transmitted to the host system 11 from the buffer memory 810.

Figure 11D:
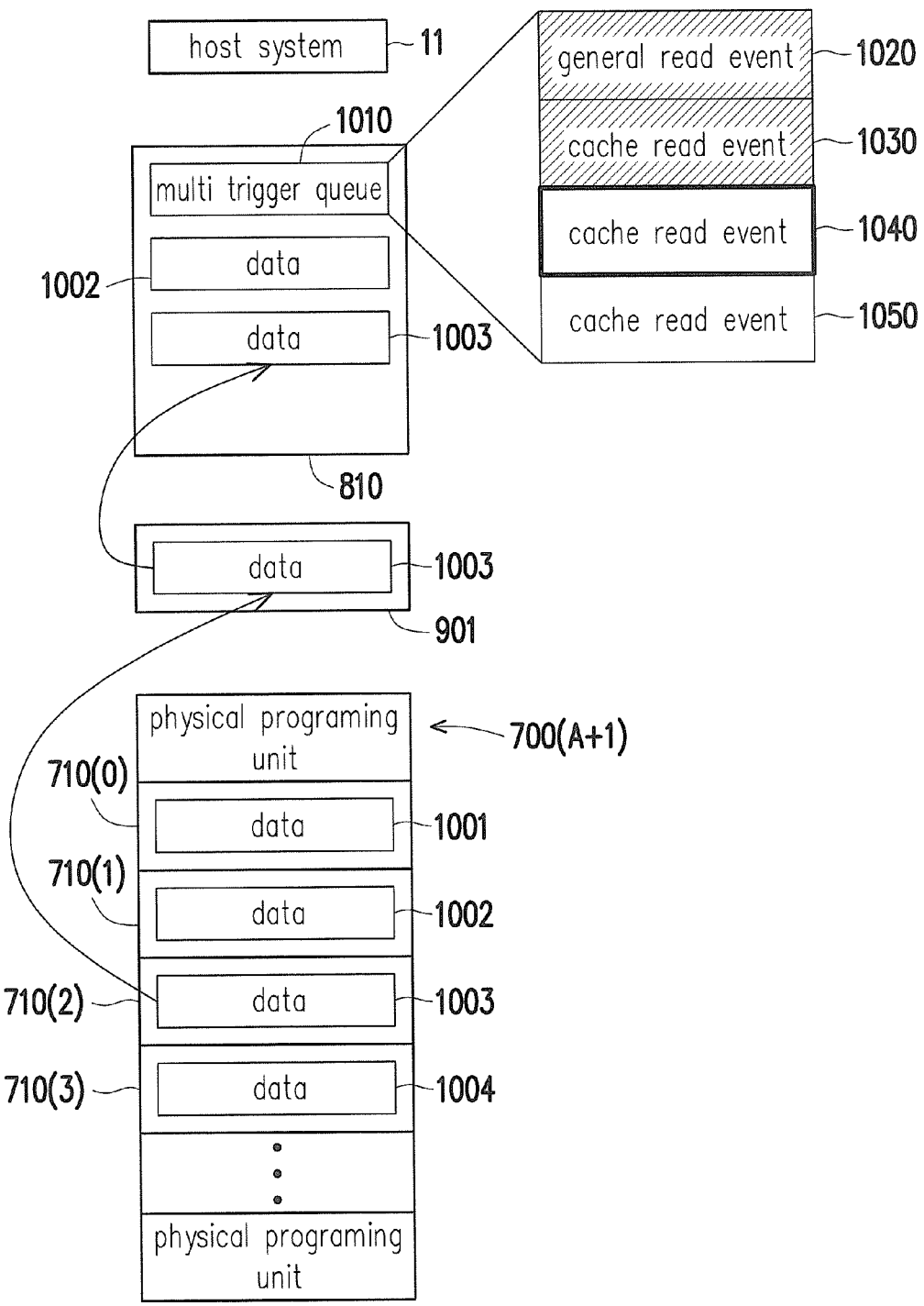

Referring to FIG. 11d, according to the cache read event 1040, data 1003 is read to the buffer area 901 from the physical programming unit 710(2). The data 1003 is transmitted to the buffer memory 810 from the buffer area 901, and a decoding for the data 1003 is executed by the error checking and correcting circuit 808. In the case where the decoding for the data 1003 fails, the multi trigger queue 1010 is reset again, and the cache read event 1040 is executed again.

Figure 11E:
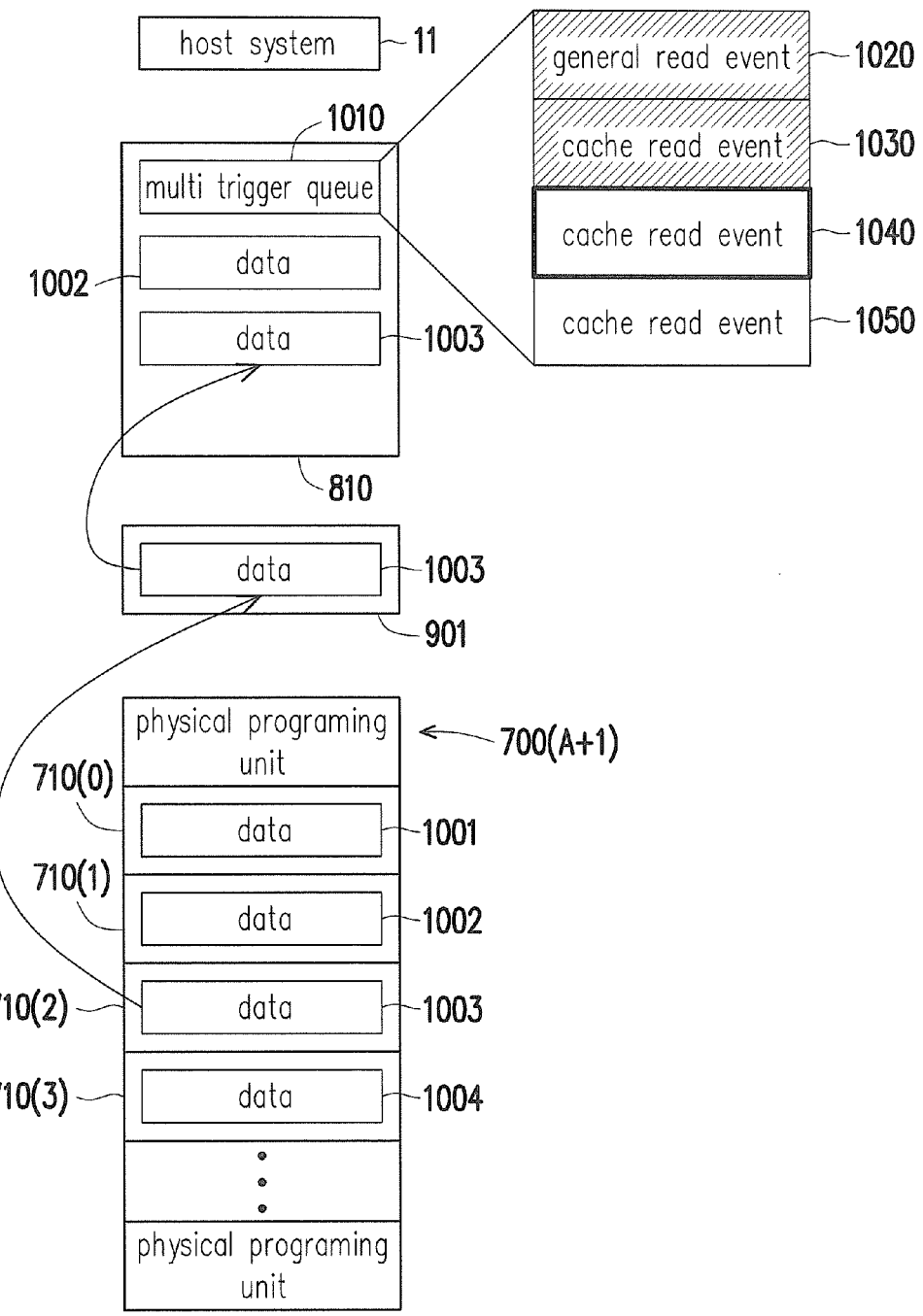

As shown in FIG. 11e, according to the cache read event 1040, data 1003 is read to the buffer area 901 from the physical programming unit 710(2). The data 1003 is transmitted to the buffer memory 810 from the buffer area 901, and a decoding for the data 1003 is executed by the error checking and correcting circuit 808. In the case where the data 1003 being read again can be decoded successfully, the decoded data 1003 is temporarily stored in the buffer memory 810, and the cache read event 1050 is the next to be executed. Later, if a read command requested for reading the data 1003 is received, the data 1003 may be instantly transmitted to the host system 11 from the buffer memory 810.

Figure 11F:
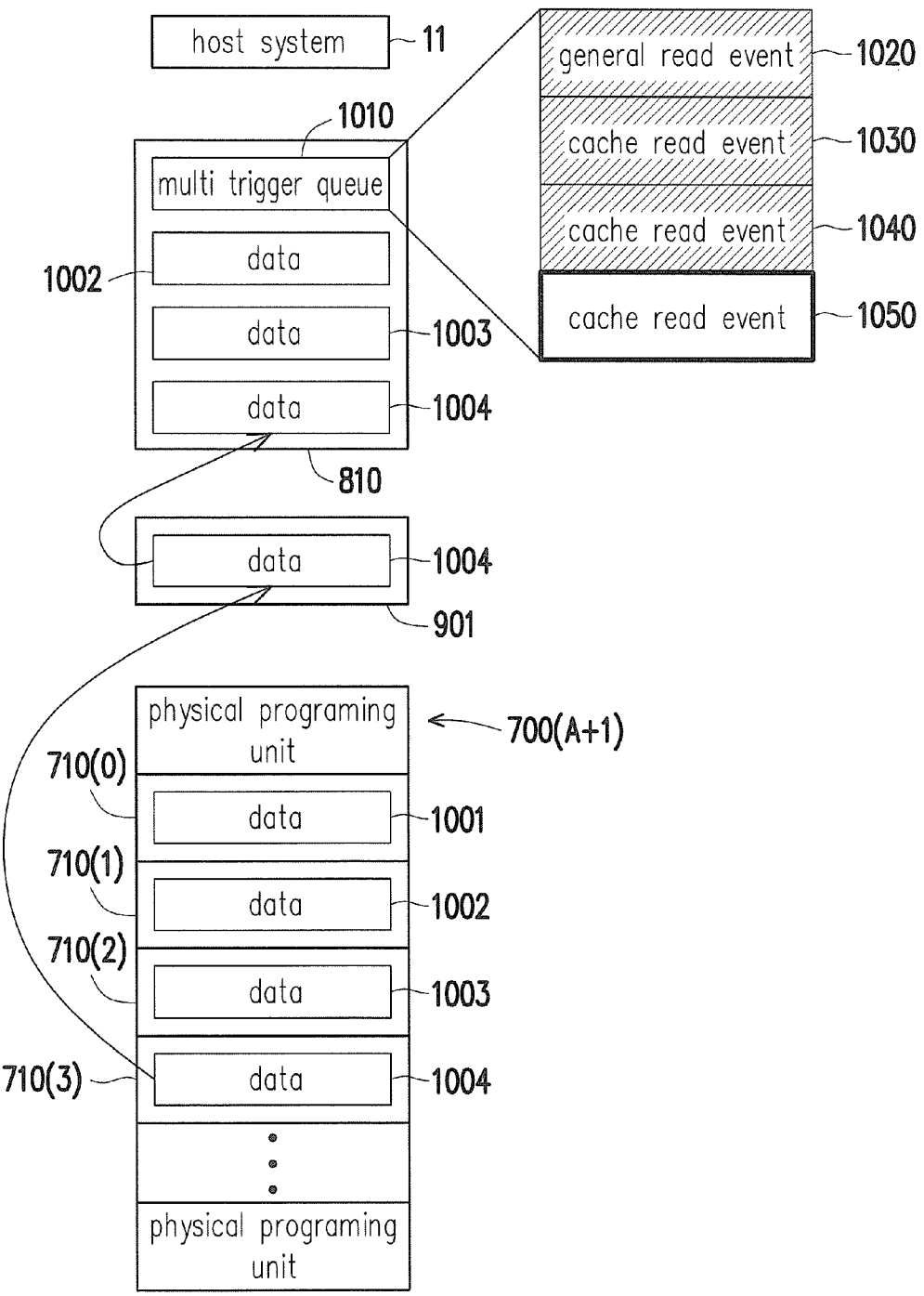

As shown in FIG. 11f, according to the cache read event 1050, data 1004 is read to the buffer area 901 from the physical programming unit 710(3). The data 1004 is transmitted to the buffer memory 810 from the buffer area 901, and a decoding for the data 1004 is executed by the error checking and correcting circuit 808. In the case where the data 1004 can be decoded successfully, the decoded data 1004 is temporarily stored in the buffer memory 810. Later, if a read command requested for reading the data 1004 is received, the data 1004 may be instantly transmitted to the host system 11 from the buffer memory 810.

It is worth mentioning that, in another exemplary embodiment, a method for resetting the multi trigger queue may be different. For example, when resetting the multi trigger queue, the memory management circuit 802 may empty the multi trigger queue, and add the read events arranged after the read event corresponding to the data decoding failure once again in the emptied multi trigger queue. The memory management circuit 802 may set the read event corresponding to the data decoding failure to be a pending event. Therein, the pending event does not exist in the reset multi trigger queue. The memory management circuit 802 may repeatedly execute the pending event which is not in the reset (i.e., the current) multi trigger queue until correct data is obtained (i.e., the decoding successes). After the correct data is obtained, the memory management circuit 802 may continue to execute the read events not yet executed in the reset (i.e., the current) multi trigger queue.

Figure 12:
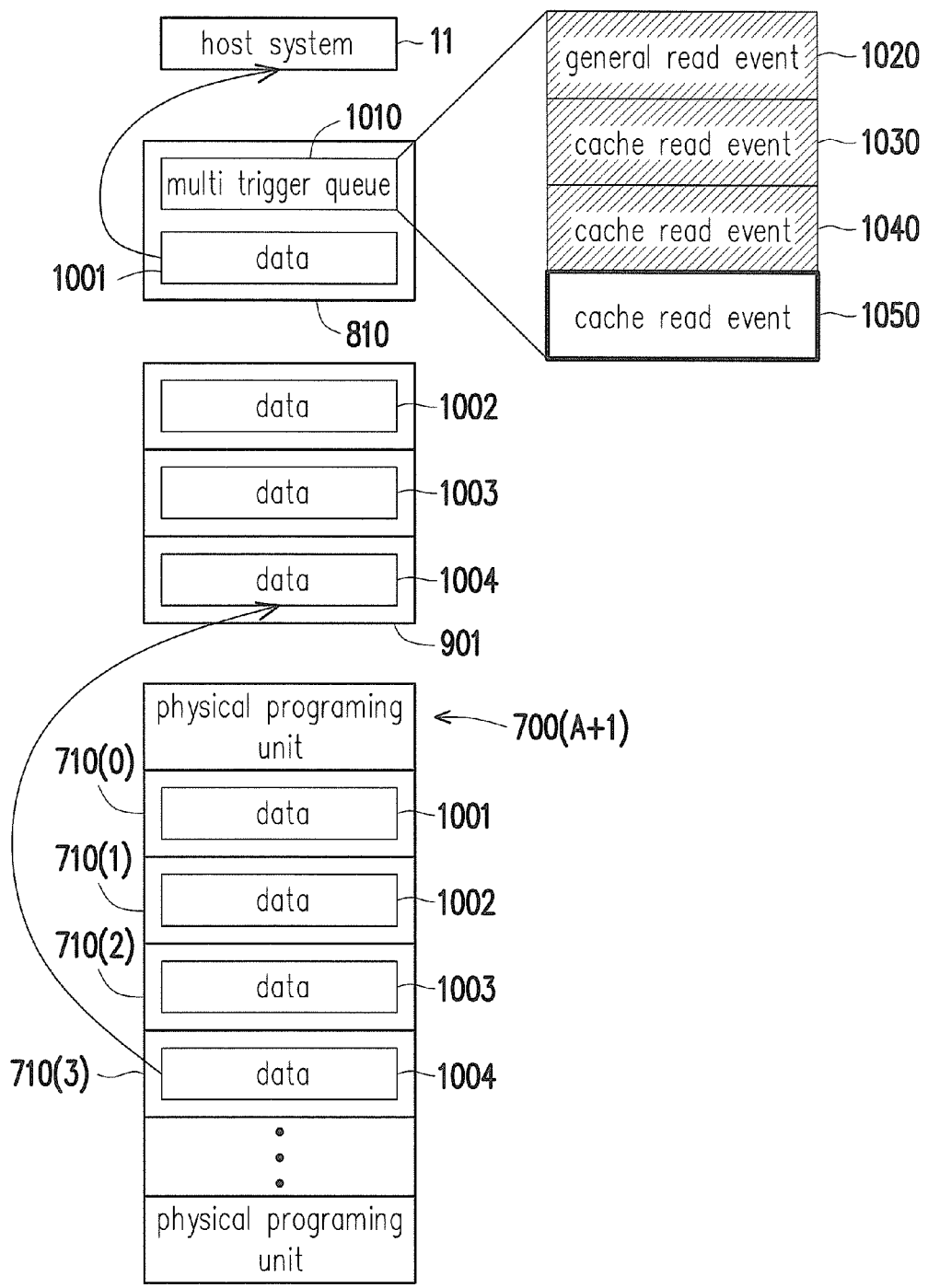
FIG. 12 is a schematic diagram for reading data according to an exemplary embodiment of the invention.

FIG. 12 is a schematic diagram for reading data according to an exemplary embodiment of the invention.

Referring to FIG. 12, a difference between the present exemplary embodiment and the foregoing exemplary embodiments is that, in the present exemplary embodiment, according to the first read command, only the data 1001 requested by the first read command is temporarily stored in the buffer memory 810, whereas the pre-read data 1002 to 1004 are temporarily stored in the buffer area 901. Only when the read command requested for the pre-read data is received, the requested data in the data 1002 to 1004 is than transmitted to the buffer memory 810 and transmitted to the host system 11 from the buffer memory 810.

It is worth mentioning that, in the foregoing exemplary embodiments, the physical programming units 710(0) to 710(3) all belong to the physical erasing unit 700(A+1). However, in another exemplary embodiment, it is also possible that the physical programming units 710(0) to 710(3) belong to different physical erasing units in the storage area 902. In addition, in the foregoing exemplary embodiments, the operation of resetting the multi trigger queue does not change positions of the read events in the multi trigger queue nor a total number of the read events. However, in another exemplary embodiment, the operation of resetting the multi trigger queue does change the positions of the read events in the multi trigger queue and/or the total number of the read events in the multi trigger queue. For example, in another exemplary embodiment, each time when one read event in the multi trigger queue is executed, such read event is removed from the multi trigger queue, and/or the position of each of the rest of the read events not yet executed in the multi trigger queue is moved up by one position.

In an exemplary embodiment, after the second read command is received, if the data requested by the second read command is not included in the pre-read data (e.g., the data 1002 to 1004), the read events originally set according to the first read command in the multi trigger queue are emptied, and the read events corresponding to the second read command are set in the multi trigger queue. For example, the read event corresponding to the second read command includes at least one general read command and a plurality of cache read commands. Methods regarding how to set the read events have been described above, which are not repeated hereinafter.

In the present exemplary embodiment, the operation of setting the read events in the multi trigger queue according to the read commands is performed by a queue management firmware. For example, the queue management firmware is executed by the memory management circuit 802 or the microprocessor in the memory controlling circuit unit 404; and the operation of sending the read command sequences according to the read events in the multi trigger queue is performed by a hardware circuit (e.g., the memory management circuit 802) in the memory controlling circuit unit 404. For example, the memory reading unit in the memory management circuit 802 may inquiry the multi trigger queue and sends the read command sequences according to the read events in the multi trigger queue. In addition, in another exemplary embodiment, the operation of setting the read events and the operation of sending the corresponding read command sequence may also be executed by a firmware or a hardware circuit, which are not particularly limited in the invention.

In the present exemplary embodiment, the buffer memory 810 includes at least two registers (hereinafter, referring to as a first register and a second register for example). When adding the read events in the multi trigger queue, the memory management circuit 802 writes read event information (also known as first read event information) of one of the read events into the first register and writes read event information (also known as second read event information) of another one of the read events into the second register. Accordingly, the memory management circuit 802 may read the first read event information in the first register and the second event information in the second register according to a predetermined rule in order to execute the operation of sending the corresponding read command sequence. For example, the predetermined rule may be a first in first out (FIFO) rule or other rules. For example, if one specific read event is arranged in front of another read event in the multi trigger queue, the read event information of the specific read event is read first to execute the operation of sending the corresponding read command sequence. Therein, the read event information includes information related to the read data such as the identification codes and/or the memory address. In addition, a number of the registers in the buffer memory 810 may also be more (e.g., 2, 3, or 4), which is not particularly limited in the invention. Alternatively, the number of the registers in the buffer memory 810 may also be equal to a maximum number of read events that can be set in the multi trigger queue.

Figure 13:
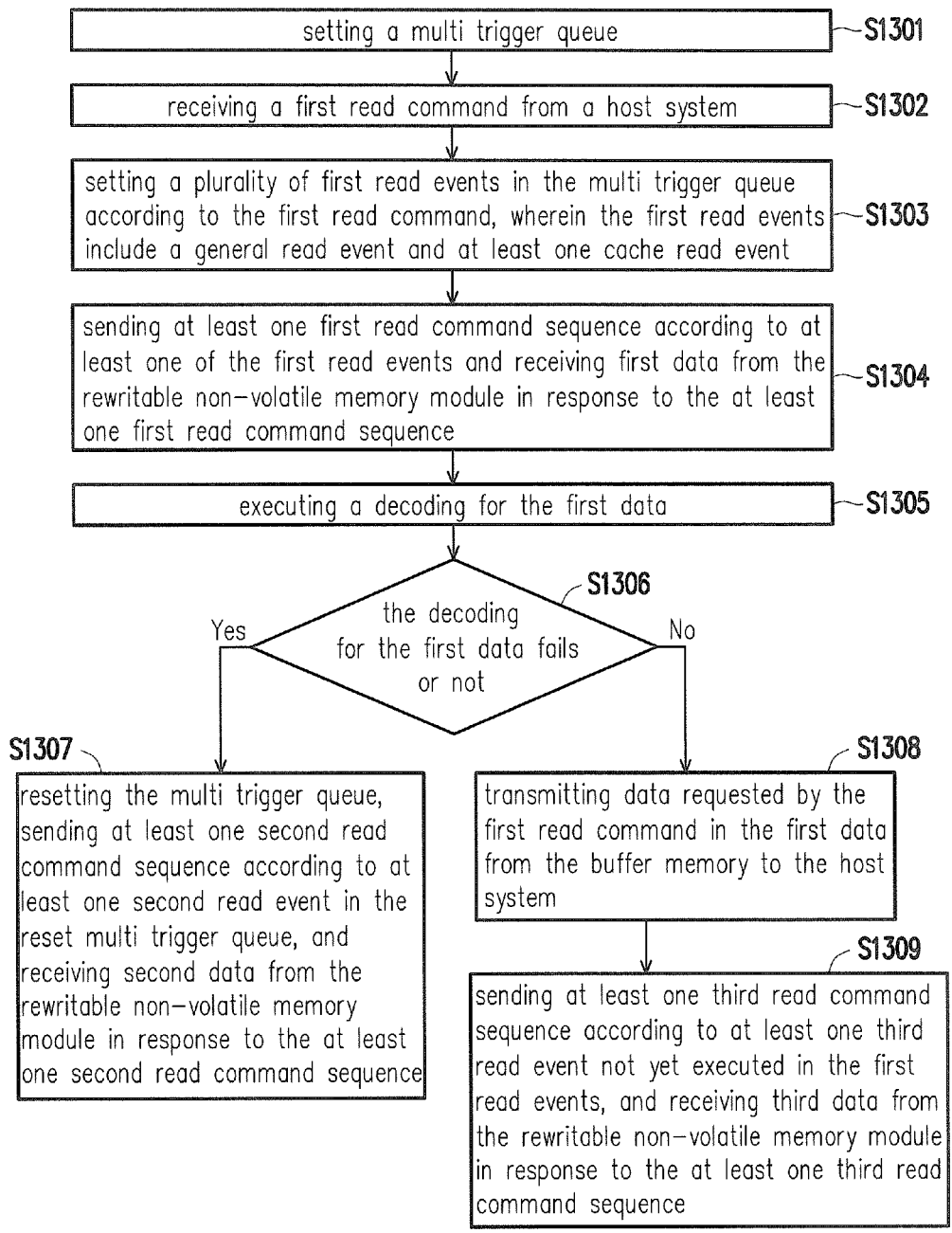
FIG. 13 is a flowchart illustrating a data reading method according to an exemplary embodiment of the invention.

FIG. 13 is a flowchart illustrating a data reading method according to an exemplary embodiment of the invention.

Referring to FIG. 13, in a step S1301, a multi trigger queue is set. In step S1302, a first read command is received from a host system. In step S1303, a plurality of first read events are set in the multi trigger queue according to the first read command. The first read events include a general read event and at least one cache read event. Data to be read corresponding to the general read event and data to be read corresponding to the cache read event belong to continuous data, the data to be read corresponding to the general read event is requested by the first read command, and the data to be read corresponding to the cache read event is not requested by the first read command. In step S1304, at least one first read command sequence is sent according to at least one of the first read events and first data is received from the rewritable non-volatile memory module in response to the at least one first read command sequence. In step S1305, a decoding for the first data is executed. In step S1306, whether the decoding for the first data fails is determined. If the decoding for the first data fails, in step S1307, the multi trigger queue is reset, at least one second read command sequence is sent according to at least one second read event in the reset multi trigger queue, and second data is received from the rewritable non-volatile memory module in response to the at least one second read command sequence. The at least one second read event includes at least one first cache read event in the at least one cache read event. If the decoding for the first data does not fail, in step S1308, data requested by the first read command in the first data is transmitted from the buffer memory to the host system. In step S1309, at least one third read command sequence is sent according to at least one third read event not yet executed in the first read events, and third data is received from the rewritable non-volatile memory module in response to the at least one third read command sequence.

Nevertheless, steps depicted in FIG. 13 are described in detail as above, thus related description is omitted hereinafter. It should be noted that, the steps depicted in FIG. 13 may be implemented as a plurality of program codes or circuits, which are not particularly limited in the invention. Moreover, the method disclosed in FIG. 13 may be implemented by reference with above exemplary embodiments, or may be implemented separately, which are not particularly limited in the invention.

In summary, according to the received read commands, the invention is capable of setting the general read event and the cache read events in the multi trigger queue. When the decoding for the data fails, the invention is capable of resetting the multi trigger queue and executing subsequent operations of reading data according to the reset multi trigger queue. Accordingly, the command reception at front end and the data management at back end may be effectively coordinated.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data reading method for a rewritable non-volatile memory module, and the data reading method comprising:
setting a multi trigger queue;
receiving a first read command from a host system;
setting a plurality of first read events in the multi trigger queue according to the first read command, wherein the first read events comprise one general read event and at least one cache read event, wherein data to be read corresponding to the general read event and data to be read corresponding to the at least one cache read event belong to continuous data, the data to be read corresponding to the general read event is requested by the first read command, and the data to be read corresponding to the at least one cache read event is not requested by the first read command;
sending at least one first read command sequence according to at least one of the first read events and receiving first data from the rewritable non-volatile memory module in response to the at least one first read command sequence;
executing a decoding for the first data; and
if the decoding for the first data fails, resetting the multi trigger queue, and sending at least one second read command sequence according to at least one second read event in the reset multi trigger queue, wherein the at least one second read event comprises at least one first cache read event in the at least one cache read event.

2. The data reading method of claim 1, wherein the rewritable non-volatile memory module comprises a storage area and a buffer area,
wherein the at least one first read command sequence instructs to read the first data from the storage area, and the at least one second read command instructs to read second data from the storage area,
wherein the first data is read to the buffer area from the storage area and transmitted to a buffer memory of a memory controlling circuit unit from the buffer area,
wherein the second data is read to the buffer area from the storage area and transmitted to the buffer memory from the buffer area.

3. The data reading method of claim 1, wherein the step of resetting the multi trigger queue comprises:
setting a read event corresponding to a data decoding failure in the first read events to be a pending event, wherein the pending event is a foremost read event arranged in the at least one second read event.

4. The data reading method of claim 1, wherein the step of resetting the multi trigger queue comprises:
setting a read event corresponding to a data decoding failure in the first read events to be a pending event, wherein the pending event does not exist in the multi trigger queue.

5. The data reading method of claim 4, wherein before the step of sending the at least one second read command sequence according to the at least one second read event in the reset multi trigger queue, the data reading method further comprises:
repeatedly executing the pending event until correct data is obtained.

6. The data reading method of claim 1, further comprising:
temporarily storing the first data in a buffer memory of a memory controlling circuit unit; and
if the decoding for the first data does not fail, transmitting data requested by the first read command in the first data from the buffer memory to the host system, and sending at least one third read command sequence according to at least one third read event not yet executed in the first read events, wherein the at least one third read event comprises at least one second cache read event in the at least one cache read event.

7. The data reading method of claim 6, further comprising:
receiving third data from the rewritable non-volatile memory module in response to the at least one third read command sequence;
executing a decoding for the third data; and
if the decoding for the third data fails, resetting the multi trigger queue, and sending at least one fourth read command sequence according to at least one fourth read event in the reset multi trigger queue, wherein the at least one fourth read event comprises at least one third cache read event in the at least one cache read event.

8. The data reading method of claim 1, wherein the step of setting the first read events in the multi trigger queue according to the first read command comprises:
setting the first read events in the multi trigger queue according to the first read command by a queue management firmware executed by a memory controlling circuit unit,
wherein the step of sending the at least one first read command sequence according to the at least one of the first read events comprises:
inquiring the multi trigger queue and sending the at least one first read command sequence according to the at least one of the first read events by a memory management circuit in the memory controlling circuit unit.

9. The data reading method of claim 1, wherein before the step of sending the at least one first read command sequence according to the at least one of the first read events, the data reading method further comprises:
writing first read event information of one of the first read events into a first register in a buffer memory;
writing second read event information of another one of the first read events in a second register of the buffer memory; and
reading the first read event information in the first register and the second read event information in the second register according to a predetermined rule.

10. A memory storage device, comprising:
a connection interface unit, configured to couple to a host system;
a rewritable non-volatile memory module; and
a memory controlling circuit unit, coupled to the connection interface unit and the rewritable non-volatile memory module,
wherein the memory controlling circuit unit is configured to set a multi trigger queue,
wherein the memory controlling circuit unit is further configured to receive a first read command from the host system,
wherein the memory controlling circuit unit is further configured to set a plurality of first read events in the multi trigger queue according to the first read command, wherein the first read events comprise one general read event and at least one cache read event, wherein data to be read corresponding to the general read event and data to be read corresponding to the at least one cache read event belong to continuous data, the data to be read corresponding to the general read event is requested by the first read command, and the data to be read corresponding to the at least one cache read event is not requested by the first read command,
wherein the memory controlling circuit unit is further configured to send at least one first read command sequence according to at least one of the first read events and receive first data from the rewritable non-volatile memory module in response to the at least one first read command sequence,
wherein the memory controlling circuit unit is further configured to execute a decoding for the first data,
wherein if the decoding for the first data fails, the memory controlling circuit unit is further configured to reset the multi trigger queue, and send at least one second read command sequence according to at least one second read event in the reset multi trigger queue, wherein the at least one second read event comprises at least one first cache read event in the at least one cache read event.

11. The memory storage device of claim 10, wherein the rewritable non-volatile memory module comprises a storage area and a buffer area, wherein the at least one first read command sequence instructs to read the first data from the storage area, and the at least one second read command instructs to read second data from the storage area, wherein the first data is read to the buffer area from the storage area and transmitted to a buffer memory of a memory controlling circuit unit from the buffer area, wherein the second data is read to the buffer area from the storage area and transmitted to the buffer memory from the buffer area.

12. The memory storage device of claim 10, wherein the operation of resetting the multi trigger queue by the memory controlling circuit unit comprises:

setting a read event corresponding to a data decoding failure in the first read events to be a pending event, wherein the pending event is a foremost read event arranged in the at least one second read event.

13. The memory storage device of claim 10, wherein the operation of resetting the multi trigger queue by the memory controlling circuit unit comprises:

setting a read event corresponding to a data decoding failure in the first read events to be a pending event, wherein the pending event does not exist in the multi trigger queue.

14. The memory storage device of claim 13, wherein before the operation of sending the at least one second read command sequence according to the at least one second read event in the reset multi trigger queue is executed by the memory controlling circuit unit, the memory controlling circuit unit is further configured to repeatedly execute the pending event until correct data is obtained.

15. The memory storage device of claim 10, wherein the memory controlling circuit unit is further configured to temporarily store the first data in a buffer memory of the memory controlling circuit unit, wherein if the decoding for the first data does not fail, the memory controlling circuit unit is further configured to transmit data requested by the first read command in the first data from the buffer memory to the host system, and send at least one third read command sequence according to at least one third read event not yet executed in the first read events, wherein the at least one third read event comprises at least one second cache read event in the at least one cache read event.

16. The memory storage device of claim 15, wherein the memory controlling circuit unit is further configured to receive third data from the rewritable non-volatile memory module in response to the at least one third read command sequence, wherein the memory controlling circuit unit is further configured to execute a decoding for the third data, wherein if the decoding for the third data fails, the memory controlling circuit unit is further configured to reset the multi trigger queue, send at least one fourth read command sequence according to at least one fourth read event in the reset multi trigger queue, and receive fourth data from the rewritable non-volatile memory module in response to the at least one fourth read command sequence, wherein the at least one fourth read event comprises at least one third cache read event in the at least one cache read event.

17. The memory storage device of claim 10, wherein the operation of setting the first read events in the multi trigger queue according to the first read command by the memory controlling circuit unit comprises:

setting the first read events in the multi trigger queue according to the first read command by a queue management firmware executed by the memory controlling circuit unit, wherein the operation of sending the at least one first read command sequence according to the at least one of the first read events by the memory controlling circuit unit comprises:

inquiring the multi trigger queue and sending the at least one first read command sequence according to the at least one of the first read events by a memory management circuit in the memory controlling circuit unit.

18. The memory storage device of claim 10, wherein the memory controlling circuit unit comprises a buffer memory, the buffer memory comprises a first register and a second register, and before the operation of sending the at least one first read command sequence according to the at least one of the first read events is executed by the memory controlling circuit unit, the memory controlling circuit unit is further configured to:

write first read event information of one of the first read events into the first register;

write second read event information of another one of the first read events into the second register; and read the first read event information in the first register and the second read event information in the second register according to a predetermined rule.

19. A memory controlling circuit unit, configured to control a rewritable non-volatile memory module, and the memory controlling circuit unit comprising:

a host interface, configured to couple to a host system;

a memory interface, configured to couple to the rewritable non-volatile memory module;

an error checking and correcting circuit;

a buffer memory; and a memory management circuit, coupled to the host interface, the memory interface, the error checking and correcting circuit and the buffer memory, wherein the memory management circuit is configured to set a multi trigger queue in the buffer memory, wherein the memory management circuit is further configured to receive a first read command from the host system, wherein the memory management circuit is further configured to set a plurality of first read events in the multi trigger queue according to the first read command, wherein the first read events comprise one general read event and at least one cache read event, wherein data to be read corresponding to the general read event and data to be read corresponding to the at least one cache read event belong to continuous data, the data to be read corresponding to the general read event is requested by the first read command, and the data to be read corresponding to the at least one cache read event is not requested by the first read command, wherein the memory management circuit is further configured to send at least one first read command sequence according to at least one of the first read events and receive first data from the rewritable non-volatile memory module in response to the at least one first read command sequence, wherein the error checking and correcting circuit is configured to execute a decoding for the first data, wherein if the decoding for the first data fails, the memory management circuit is further configured to reset the multi trigger queue, and send at least one second read command sequence according to at least one second read event in the reset multi trigger queue, wherein the at least one second read event comprises at least one first cache read event in the at least one cache read event.

20. The memory controlling circuit unit of claim 19, wherein the rewritable non-volatile memory module comprises a storage area and a buffer area,
   wherein the at least one first read command sequence instructs to read the first data from the storage area, and the at least one second read command instructs to read second data from the storage area,
   wherein the first data is read to the buffer area from the storage area and transmitted to the buffer memory from the buffer area,
   wherein the second data is read to the buffer area from the storage area and transmitted to the buffer memory from the buffer area.

21. The memory controlling circuit unit of claim 19, wherein the operation of resetting the multi trigger queue by the memory management circuit comprises:
   setting a read event corresponding to a data decoding failure in the first read events to be a pending event, wherein the pending event is a foremost read event arranged in the at least one second read event.

22. The memory controlling circuit unit of claim 19, wherein the operation of resetting the multi trigger queue by the memory management circuit comprises:
   setting a read event corresponding to a data decoding failure in the first read events to be a pending event, wherein the pending event does not exist in the multi trigger queue.

23. The memory controlling circuit unit of claim 22, wherein before the operation of sending the at least one second read command sequence according to the at least one second read event in the reset multi trigger queue is executed by the memory management circuit, the memory management circuit is further configured to repeatedly execute the pending event until correct data is obtained.

24. The memory controlling circuit unit of claim 19, wherein the memory management circuit is further configured to temporarily store the first data in the buffer memory,
   wherein if the decoding for the first data does not fail, the memory management circuit is further configured to transmit data requested by the first read command in the first data from the buffer memory to the host system, and send at least one third read command sequence according to at least one third read event not yet executed in the first read events, wherein the at least one third read event comprises at least one second cache read event in the at least one cache read event.

25. The memory controlling circuit unit of claim 24, wherein the memory management circuit is further configured to receive third data from the rewritable non-volatile memory module in response to the at least one third read command sequence,
   wherein the error checking and correcting circuit is further configured to execute a decoding for the third data,
   wherein if the decoding for the third data fails, the memory management circuit is further configured to reset the multi trigger queue, and send at least one fourth read command sequence according to at least one fourth read event in the reset multi trigger queue, wherein the at least one fourth read event comprises at least one third cache read event in the at least one cache read event.

26. The memory controlling circuit unit of claim 19, wherein the operation of setting the first read events in the multi trigger queue according to the first read command by the memory management circuit comprises:
   setting the first read events in the multi trigger queue according to the first read command by a queue management firmware executed by the memory management circuit,
   wherein the operation of sending the at least one first read command sequence according to the at least one of the first read events by the memory management circuit comprises:
   inquiring the multi trigger queue and sending the at least one first read command sequence according to the at least one of the first read events by a memory reading unit in the memory management circuit.

27. The memory controlling circuit unit of claim 19, wherein the buffer memory comprises a first register and a second register, and before the operation of sending the at least one first read command sequence according to the at least one of the first read events is executed by the memory management circuit, the memory management circuit is further configured to:
   write first read event information of one of the first read events into the first register;
   write second read event information of another one of the first read events into the second register; and
   read the first read event information in the first register and the second read event information in the second register according to a predetermined rule.

* * * * *